US008925484B2

(12) United States Patent  
Maier, Jr. et al.

(10) Patent No.: US 8,925,484 B2
(45) Date of Patent: Jan. 6, 2015

(54) RETAINING DEVICE FOR TEAT CUPS AND ACTUATOR FOR INCITING A MOVEMENT OF A TEAT CUP CLUSTER

(76) Inventors: Jakob Maier, Jr., Tuerkheim (DE); Wilfried Hatzack, Tuerkheim (DE)

( * ) Notice: Subject to any disclaimer, the term of this patent is extended or adjusted under 35 U.S.C. 154(b) by 2403 days.

(21) Appl. No.: 10/593,923

(22) PCT Filed: Mar. 23, 2005

(86) PCT No.: PCT/EP2005/003128
§ 371 (c)(1),
(2), (4) Date: Jun. 25, 2007

(87) PCT Pub. No.: WO2005/094566
PCT Pub. Date: Oct. 13, 2005

(65) Prior Publication Data
US 2007/0277737 A1 Dec. 6, 2007

(30) Foreign Application Priority Data

Mar. 23, 2004 (DE) .......................... 10 2004 014 210
Jul. 12, 2004 (DE) .......................... 10 2004 033 637

(51) Int. Cl.
*A01J 5/02* (2006.01)
*A01J 7/00* (2006.01)
*A01J 5/007* (2006.01)
*A01J 5/017* (2006.01)
*A01J 5/04* (2006.01)
*A01J 7/02* (2006.01)

(52) U.S. Cl.
CPC .. *A01J 7/00* (2013.01); *A01J 5/007* (2013.01); *A01J 5/017* (2013.01); *A01J 5/044* (2013.01); *A01J 7/02* (2013.01)
USPC ....................................... 119/14.18

(58) Field of Classification Search
CPC .................................... A01J 5/10; A01J 5/044
USPC .............................................. 119/14.8, 14.18
See application file for complete search history.

(56) References Cited

U.S. PATENT DOCUMENTS 2,853,051 A 9/1958 Bauer
3,938,470 A 2/1976 Pace
(Continued)

FOREIGN PATENT DOCUMENTS

DE 914 916 7/1954
DE 1 278 166 9/1968
(Continued)

OTHER PUBLICATIONS

International Search Report dated Aug. 30, 2005 (8 pages).
(Continued)

*Primary Examiner* — Brian M O'Hara
(74) *Attorney, Agent, or Firm* — Flynn, Thiel, Boutell & Tanis, P.C.

(57) ABSTRACT

According to the invention, an actuator is provided for a milking installation, wherein the actuator is fixed at a distance to a teat cup cluster and is mechanically coupled to the teat cup cluster via a flexible component so as to incite a stimulating movement of the teat cup cluster on the udder by means of an actuator element. The inventive actuator can also be used to adjust the angle of tilt of the teat cup cluster during milking. The invention also provides a retaining device for teat cups, comprising a fastening device for fixing the retaining device on a predetermined milking position, wherein the retaining device is furthermore formed to maintain, during a first operational phase, every teat cup of a plurality of teat cups in a fixed position relative to each other and to allow manual access to every retained teat cup in such a manner that during a second operational phase every teat cup can be manually moved in several directions relative to the retaining device and at least one additional teat cup.

40 Claims, 18 Drawing Sheets

(56) References Cited

U.S. PATENT DOCUMENTS

| | | | |
|---|---|---|---|
| 4,011,838 A * | 3/1977 | Nordegren et al. | 119/14.08 |
| 4,273,070 A | 6/1981 | Hoefelmayr | |
| 4,941,433 A | 7/1990 | Hanauer | |
| 6,269,766 B1 | 8/2001 | Birk | |
| 6,401,654 B1 | 6/2002 | Hallsten et al. | |
| 7,162,970 B2 * | 1/2007 | Maier, Jr. | 119/14.18 |
| 2005/0072363 A1 * | 4/2005 | Van der Lingen et al. | 119/14.13 |

FOREIGN PATENT DOCUMENTS

| | | |
|---|---|---|
| DE | 32 17 443 A1 | 12/1982 |
| DE | 39 16 653 A1 | 12/1989 |
| DE | 39 31 769 A1 | 4/1991 |
| DE | 43 39 131 A1 | 5/1995 |
| DE | 692 32 021 T2 | 4/2002 |
| EP | 0 774 203 A1 | 5/1997 |
| EP | 1 208 742 A2 | 5/2002 |
| EP | 1 447 002 A1 | 8/2004 |
| WO | WO 02/15676 A1 | 2/2002 |
| WO | WO 0215676 A1 * | 2/2002 |
| WO | WO 02069696 A1 * | 9/2002 |
| WO | WO 02/089562 A1 | 11/2002 |

OTHER PUBLICATIONS

Examination Report for corresponding German Application No. 10 2004 033 637.7 dated Jul. 29, 2009 (5 pgs.).

* cited by examiner

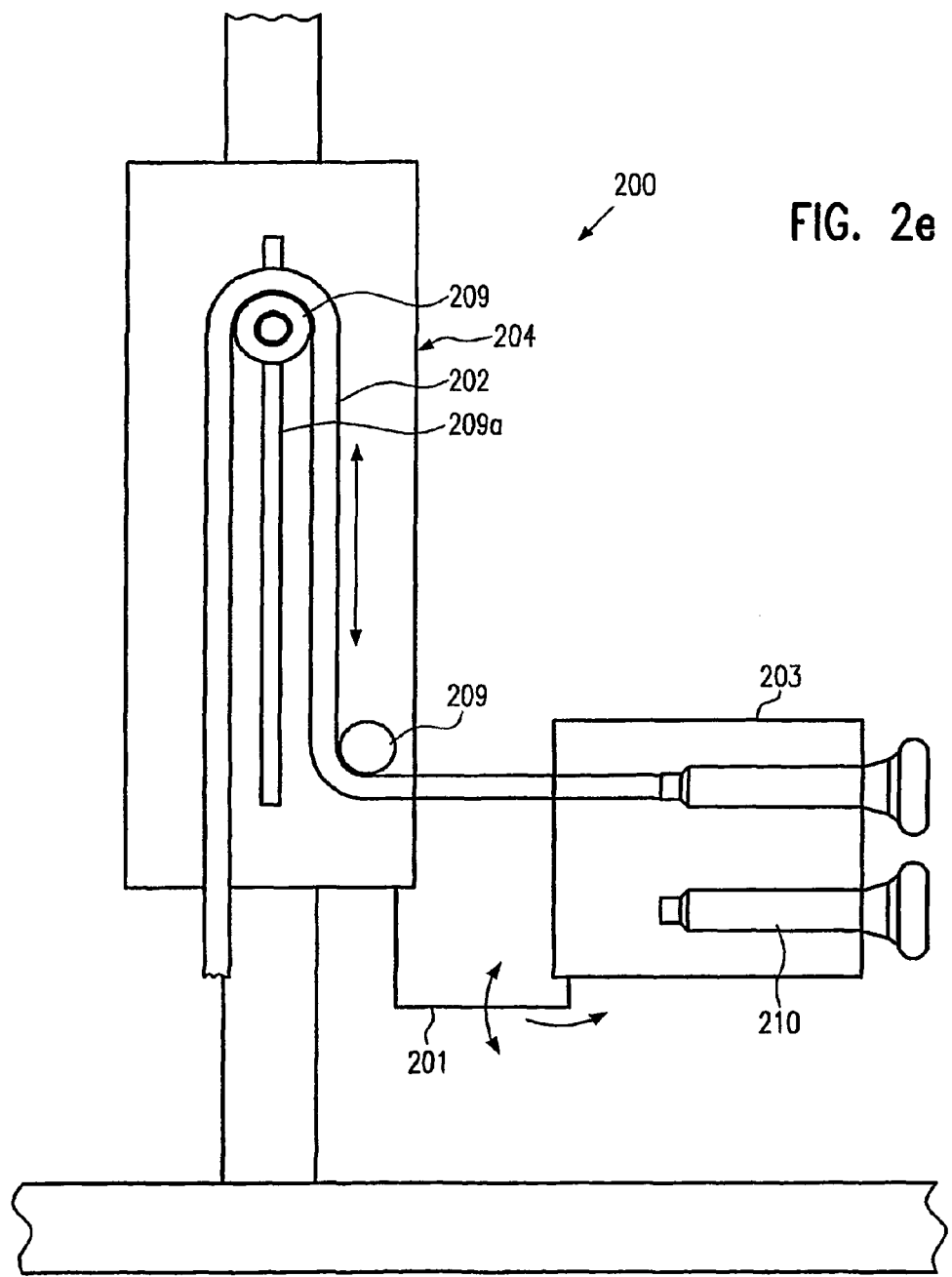

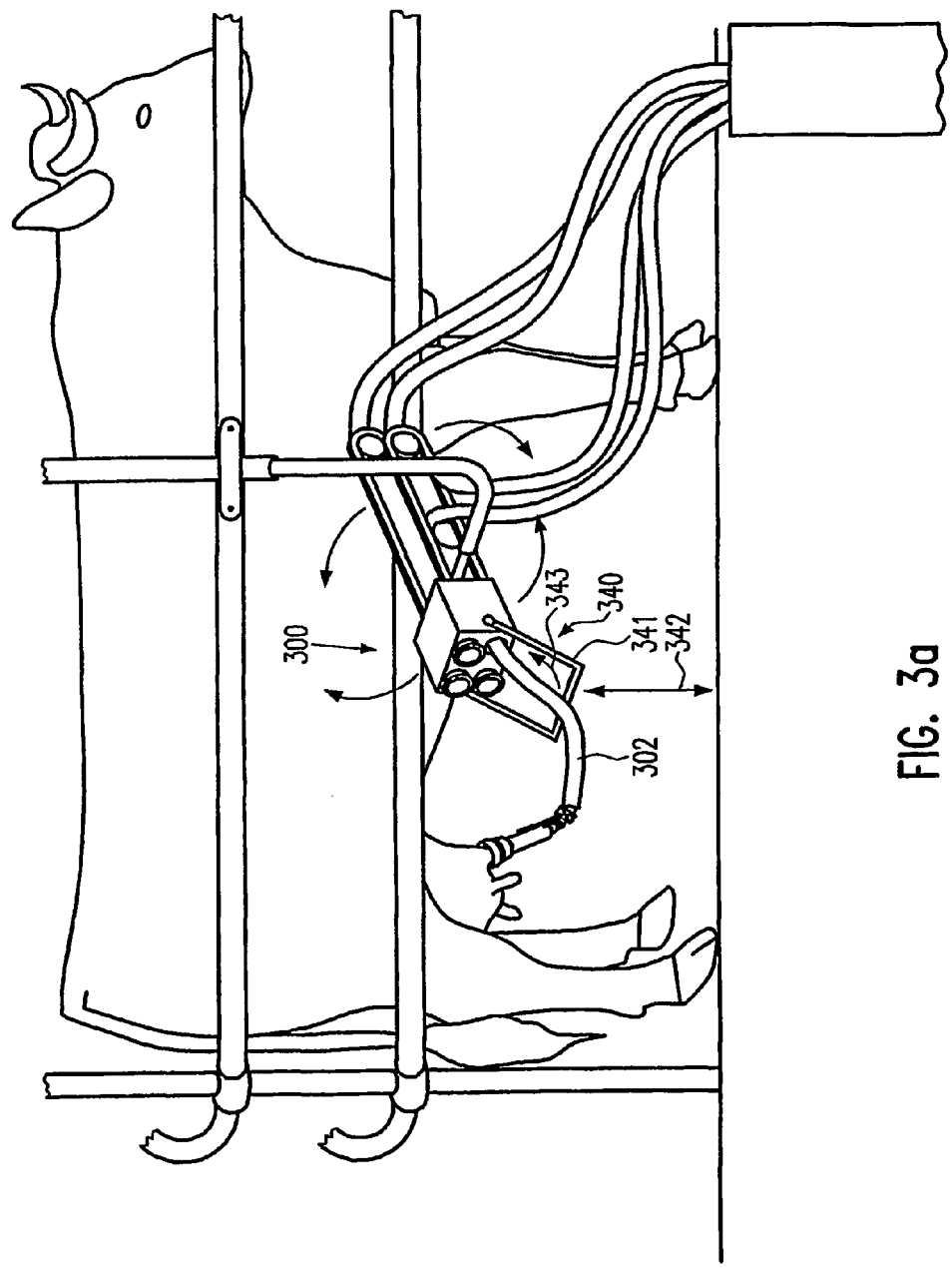

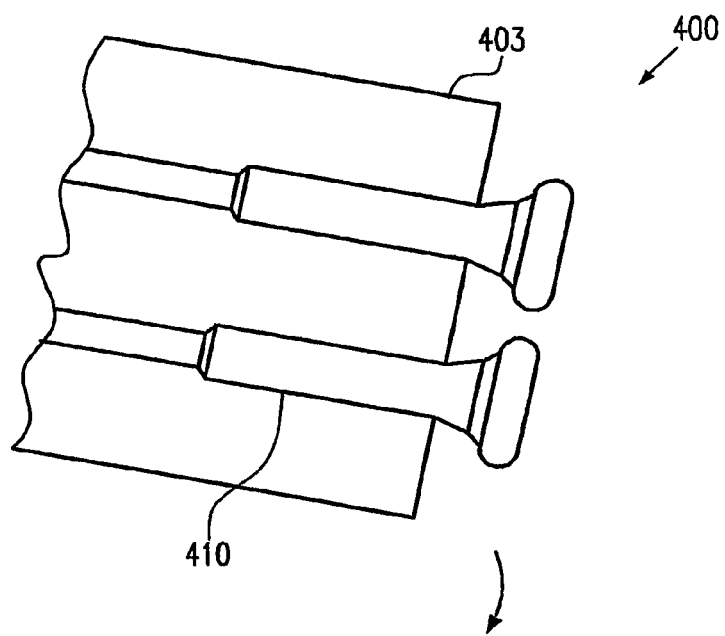
FIG. 4c
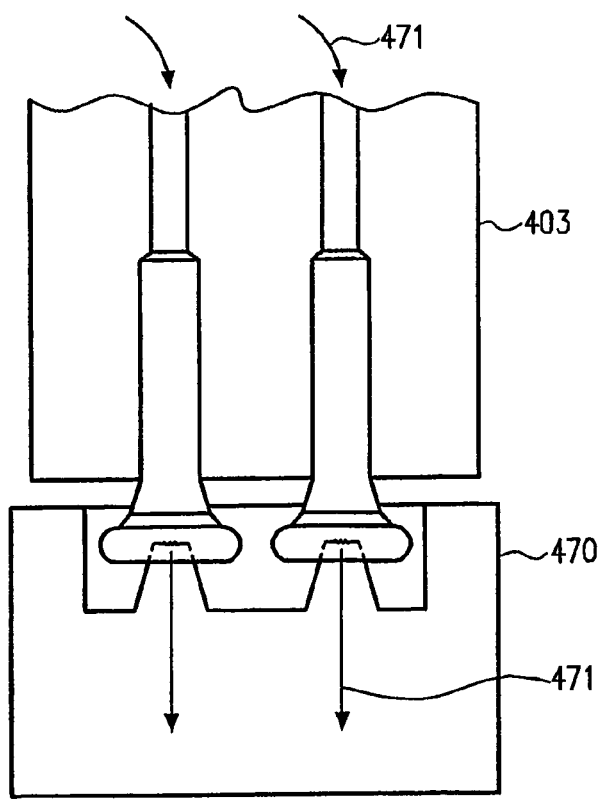

RETAINING DEVICE FOR TEAT CUPS AND ACTUATOR FOR INCITING A MOVEMENT OF A TEAT CUP CLUSTER

The invention under consideration generally relates in one aspect to the automatic milking of production animals, wherein during the milking process, a manual intervention is required, at least to some extent. In particular, the invention under consideration relates to a retaining device for teat cups that can be used in teat cup clusters and milking parlours in which manual attachment of the teat cups to the teats of an animal is necessary.

In a further aspect, the invention under consideration generally relates to devices and methods for performing stimulation before and during the milking process and for positioning a teat cup cluster in milking installations that allow automatic milking, wherein a teat cup cluster that is connected to a vacuum system is manually or automatically positioned on the teats of the animal.

When production animals, such as cows, are kept for dairy farming, it can be assumed, given the current and medium-term political and economic situation, that agricultural operations can operate profitably only when a certain minimum number of production animals is kept, if one disregards certain niche applications in the form of part-time farmers. Because the profitability of an agricultural operation for dairy farming does not depend only on the absolute number of production animals, but instead also to a special degree on the individual output of each individual animal, a high milk yield per animal must be achieved with the lowest possible personnel allocation, in spite of the large number of animals. In addition to suitable holding and feeding of the animals, the milking process also plays a large role in the milk yield achieved per animal, wherein the degree to which the milking process is automated essentially determines the personnel expenditure. In the context of profitability, it is advantageous to automate the milking process as much as possible with justifiable machine expenditure, wherein a demanded high level of hygiene must be maintained. A purely manual milking process is no longer feasible even in most smaller to medium-sized operations, because, in particular, a high level of professional competence and a large time expenditure are necessary for the milking process. Many years of experience and research indicate that a high milk yield per animal is essentially obtained when the milking process reproduces the natural suckling process of the calf in a way that is as true to nature as possible. For this purpose, devices have been developed in the last 80 to 100 years that make possible more or less automated milking, wherein the level of "true to nature" as applied to the milking process depends very heavily on the materials used, the devices used and the operating method of the installations. Currently a manner of milking is preferred in which stimulating pulses, differing to some extent, are exerted on the animal before and during the milking and wherein often two udder quarters are alternatingly acted upon by vacuum and a massaging movement in a push-pull movement, in pulses. In this process, during the sucking phase, in which the vacuum that is constantly under the teat is in contact with the vacuum that predominates in the milk line, milk is sucked out of the teat, while in the following release phase, in which the teat cup liner collapses and massages the teat, massaging of the teat tissue takes place. The type of stimulation, the nature of the teat cup liner, the level of the milking vacuum and the frequency of the sucking and release phases are important points that determine, on the one hand, the length of time the milking process lasts and, on the other, the health of the animal's udder.

Currently, there are also fully automatic milking installations, so-called robotic milking machines, available on the market, in which the milking process is performed in a fully automated manner, without any manual intervention being necessary. In these installations, the animals can enter an appropriate cell, where they are electronically identified and then, after successful identification and with corresponding entitlement, prepared for a milking process. In this process, cleaning mechanisms are put on over the udder and then motor-driven teat cups, controlled by a central computer system, are attached to the teats and the stimulation and milking process is begun. This type of keeping of production animals requires an extremely high expenditure, however, with regard to the procurement and maintenance costs for the robotic milking machines, particularly when strict hygiene requirements must be met, so that these mechanisms can be problematic in practice, particularly because more recent research indicates that even for large agricultural operations, there is not a more economically profitable use of milking robots in comparison to large operations with milking parlours.

For the majority of agricultural operations, the milking process takes place in a semi-automated manner, wherein, depending on the size of the operation, suitably equipped milking parlours are provided that the animals seek out, or the milking installation is formed appropriately in order to milk the animals at the corresponding stands.

With reference to FIGS. 1a and 1b, now a typical milking parlour and the difficulties that typically arise during the milking process will be described in greater detail.

FIG. 1a is a schematic perspective view of a teat cup cluster 100 that has several teat cups 110, which in turn are provided with corresponding teat cup liners 120. The teat cups 110 are typically metal containers into which the teat cup liners 120 are partially inserted, so that a hollow space develops between the outer wall of the teat cup liner 120 and the inner wall of the teat cup 110. Typically, a configuration of this type is described as a two-chamber cup, because the hollow space forms a first chamber and the interior of the teat cup liner 120 defines a second chamber. Furthermore, the teat cup cluster 100 comprises a milking claw 115, which as a rule has two chambers, each of which is connected to two teat cups 110 by means of flexible milk hoses 116. The milking claw 115 is typically connected to a corresponding milk collecting bowl by means of one or two additional flexible milk hoses 117. Furthermore, the milking claw 115 has two control connections 118, which are in turn connected to the hollow space of the teat cups 110 by means of corresponding control hoses 119.

FIG. 1b schematically shows a part of a milking parlour 150 with a frame 152 to which an adjustable support 151 is mounted. The milk hoses 117 and control lines 121, which are connected to the control connections 118 of the milking claw 115, are fixed to the support 151 in such a way that diversion of the removed milk from the milking claw 115, a reliable provision of the milking vacuum via the milk lines 117 and correct positioning of the milking claw 115 during the milking process are guaranteed. The position of the teat cup cluster 100, i.e., the position of the teat cups 110 and the position of the milking claw 115, is essentially determined by the relatively high weight of the teat cup clusters 100, i.e., approximately 3 to 5 kg, provided that the hoses 117 and 121 do not exert overly large tensile forces on the teat cup cluster. Furthermore, a cable device 153 is provided in order to pull the teat cup cluster 100 off after the milking process.

At the start of a milking process, the animal is led into the milking parlour 150 or the animal seeks out the milking parlour 150 on its own initiative. As soon as the animal has taken the appropriate position, the support 151 can be appropriately adjusted where necessary, and the teat cup cluster 100 can be attached to the animal's teats. In this connection, however, it is necessary that the teat cup cluster 100, which is initially in a position as shown by the teat cup 110a in FIG. 1a, be held under the udder of the animal by the milker. At the same time, it is necessary that the teat cups 110 be suspended essentially vertically, because as a result of the bending of the milk hoses 116 the milking vacuum that is constantly applied in the milk line 117 via the milking claw 115 is essentially maintained, because precisely the bent area of the milk hose 116 acts as a seal. In other words, this means that at the start of the milking process, the relatively heavy teat cup cluster 100 must be guided by the milker into a correct position under the teat and held there with one hand, until all teat cups, one after the other, are attached to the teats. This requires a relatively high expenditure of energy, which can, particularly in the case of a larger number of animals, at least lead to a heavy load on the body and/or, in the long run, to an adverse effect on the health. Furthermore, there is the danger that the teat cups 110, which hang down, with the head areas of the teat cup liners 120 that are led out, come into contact with, for example, the ground of the milking parlour during the attachment of the teat cup cluster 100, thereby leading to contamination of the teat cup liners 120 even before the milking process has started. In this way, the effect of a manual cleaning of the teats possibly carried out previously can be impaired considerably, so that, as a result of the introduction of dirt and pathogens through the contaminated teat cup liners 120, not only is the quality of the milk impaired, the health of the animal's teats may possibly also be affected.

Subsequently, the separate teat cups 110, one after the other, are attached to the individual teats, wherein, as presented earlier, the teat cup cluster 100 is to be held in the correct position with one hand, while the other hand attaches the teat cups 100 to the teats. After attachment of the teat cup cluster 100 and, where applicable, after adjustment of the cable 153 and/or the support 151, the actual milking process can be started, for example, with a corresponding stimulation phase. In this process, corresponding mechanical stimuli are transferred, via the control lines 121 or via additional control devices operated with compressed air (not shown), to the animal's teats via the teat cups 110. By means of the activation of two teat cups, said activation usually being applied in phase opposition, an oscillation of the teat cup cluster 100 results during the milking process, with said oscillation furthermore contributing to a relaxing of the udder musculature and therefore to improved milk flow.

The precise course of the milking process depends on the strategy selected and typically comprises a stimulation phase, a phase in which the milk from each quarter is first inspected by sight, the actual milking process, which can also continue to be accompanied by stimulating activity, and a corresponding post-milking phase. After the completion of the milking process, i.e., at that time at which the milk flow from the udder of the animal has reached a certain minimum value, the teat cup cluster 100 must again be removed from the udder, wherein an energy-consuming process is again necessary. In particular, the teat cup cluster 100 must again be held in the correct position while the individual teat cups 110 are removed from the teats, because the penetration of air into the milk lines 117 should be kept as low as possible. Furthermore, the risk that the teat cups 110 come into contact with the ground also arises in this phase of the milking process, should, for example, the teat cup cluster 100 be briefly held too low, so that the risk of further dirtying of and damage to individual parts of the teat cup cluster 100 could arise. Particularly in operations with a relatively high number of animals and in the event of correspondingly inexperienced personnel, it is possible that the cleaning of the teat cup cluster 100 before it is attached to the next animal could be performed without the necessary care, so that the risk of milk contamination and transmission of pathogens to the animal udder is relatively pronounced.

Because the introduction of fully automatic milking installations is not a practicable solution for most agricultural operations due to the costs and due to the possibly lower efficiency, one object of the invention under consideration is to structure the partially automated milking process more efficiently, so that the expenditure of energy and/or health impairments are reduced and the hygiene conditions are improved.

For milk-producing agricultural operations, it is very important to produce high quality milk in large amounts at the lowest possible production costs. This development will intensify even more as a result of EU expansion, and will force farmers to produce milk in even more economical manners. In addition to the costs for housing and feeding the animals in a manner appropriate to the species, it is essential that personnel costs be reduced in milk production. For this reason, it is necessary for larger and larger numbers of animals to be cared for by an ever-decreasing number of trained personnel, wherein particularly the milking of the animals is increasingly being automated, in order to make it possible to carry out this time-consuming process in an efficient manner. At this time, there are essentially two systems that are used during milking for milk production in medium-sized and larger operations. On the one hand, animals are milked in a fully automatic manner by so-called robotic milking machines, wherein the animals essentially seek out appropriate milking cubicles and then are milked completely by machine, wherein the cleaning of the udder, the attachment of the teat cups, the starting and monitoring of the milking process and the removal of the teat cups take place in a fully automated manner. On the other hand, so-called milking parlours are used, in which the cleaning of the udder, possibly a certain pre-stimulation and the attachment and removal of the teat cup cluster is handled manually or by machine. The milking process itself typically proceeds automatically, wherein the end of the milking process is then detected either by the personnel or by a sensor, which optionally can take place with the aid of diverse measurement signals that can be generated during the milking process. Although in principle, fully automatic milk production would seem to be desirable from an economic point of view, certain restrictions nevertheless arise as a result of the fully automatic milking process using a robotic milking machine, because the acquisition costs and maintenance costs are relatively high. Furthermore, more recent research appears to indicate that over the long run, a lower milk yield is reached with common robotic milking machines compared to operations that carry out the milking process with the aid of milking parlours. But even in the case of agricultural operations with milking parlours, there are considerable differences in the long-term milk yield, which can, to some extent, be traced to the devices and materials used in the milking parlours and to the milking technique used.

In order to achieve a high milk yield, it is crucial that the animals' health, particularly the health of the udder, and the animals' milkability be kept at a high level. In particular, this is achieved by having the milking process proceed in a manner that is as close to nature as possible, i.e., that copies the suckling of the calf as closely as possible. For example, before the actual removal of the milk, a stimulation process should be performed that serves to put the cow into a state where it is ready to be milked. During the stimulation phase before the milking process, the hormone oxytocin, necessary for releasing the milk from the alveoli, is distributed in the corresponding teat cisterns of the udder quarters. Because this hormone takes roughly a minute to affect the udder, at least one minute of stimulation is required in order to initiate an efficient milking process. Naturally, before and after the milking process, conditions must be created that guarantee a pleasant atmosphere for the animal, so that cramping of the smooth udder musculature is reliably prevented before and during the milking process. As the number of animals to be looked after during the milking process by a single person increases, however, often the manual udder cleaning and the stimulation process are carried out insufficiently or for too short a time, so that the milking process already begins before the oxytocin has become sufficiently effective. In order to shorten the duration of the manual stimulation or to make it possible to drop it completely, automatic stimulation is therefore often carried out with the teat cup cluster attached, wherein the pulsation frequency, i.e., the frequency with which the teat cup liner is folded in and released, is increased so that no removal of the milk takes place and a certain massage effect is achieved on the teats. This relatively high pulsation frequency is then maintained for a certain length of time, and then, for example, continuously reduced, until the actual pulsation frequency for the milking process, with the appropriate length of time allowed for the sucking and release phases, is reached, so that an increasing quantity of milk is continuously milked during this transition phase.

Although relatively high yields can be achieved with this milking technique, it has been seen that over the long term, the yield of the entire herd can nevertheless remain below the expected levels. The reasons for this could be, for example, that the udder health is not optimal and/or that the animals are not sufficiently milked, which can lead to losses in the milk yield in the long term. Crucial for a high level of udder health is the effective reduction or prevention of the penetration of disease-causing germs into the teat and then into the interior of the udder quarter. In the case of the natural course of the suckling process, the animal has certain natural protective mechanisms that hinder or prevent the penetration of disease-causing germs. On the one hand, the teat is effectively closed by the constrictor muscle during drinking pauses, so that penetration of germs is reduced. Furthermore, the interior of the teat canal is lined by a secretion of the mucous membrane, the so-called sebum, which is arranged in such a way that the lodging and further transport in the direction of the udder interior are reduced. This acid seal that is achieved by the sebum serves as a second barrier that is effective in the case of a constrictor muscle that does not close or that does not close completely, in order to provide further protection against contamination of the udder.

As a result of the semi-automatic and particularly the fully automatic milking process, it is possible, however, for these barriers to be damaged. For example, often a hardening of the teats and therefore an incomplete closing of the teat canal is observed.

Furthermore, in the case of the automatic stimulation described previously, an increased pulsation frequency can, for example, lead to an increased number of leukocytes if the stimulation phase lasts too long, which indicates an increased number of cells due to irritation of the mucous membrane. It is assumed that as a result of the automatic stimulation at an increased pulsation frequency, a "hammering" of the teat, so to speak, takes place, which also therefore affects the teat canal and the mucous membranes lining the interior of the teat, so that, as a result of a certain damage to the mucous membranes, the production of sebum is impaired and there can be increased penetration of disease-causing germs. Because a certain minimum length of time is necessary for the stimulation in order to distribute the oxytocin and to ensure its effectiveness on the udder, the stimulation phase should be carried out for at least this length of time and should then rapidly proceed into an efficient milking process. Therefore, although a shortening of the stimulation caused by the pulsation frequency could possibly reduce or avoid the damage to the interior mucous membranes, at the same time, this would lead to a less efficient milking process, as a result of which particularly the long-term milk yield would be reduced.

Furthermore, stimulation during the milking process is advantageous, in order to ensure a constant relaxation of the smooth udder musculature, so that the milk can be constantly transported from the milk-producing cells into the udder quarters, so that a high degree of removal of the milk can be achieved, which is important for the long-term udder health and for a high level of milk production. With conventional teat cup clusters, there is an attempt to achieve the relaxation of the smooth udder musculature by means of carrying out the sucking and release phases out of phase for two udder quarters each, so that a certain oscillation of the teat cup cluster is caused. In this case, the stimulating effect depends on the teat cup cluster used, among other influences, because, for example, the condition of the short milk hoses in interaction with the size and mass of the milking claw influences the type of oscillation of the teat cup cluster caused by the out-of-phase pulsing. Consequently, stimulation during the actual milking process is essentially determined by the frequency of the pulsator in interaction with the teat cup cluster, as a result of which no optimal stimulation is reached under some conditions, particularly since during the natural suckling process, the stimulation of the teat or the udder is also caused by spasmodic movements of the calf, among other causes.

A further problem in milking with conventional teat cup clusters is that often, as a result of breeding, the animal's udder quarters are shaped differently, so that, for example, the rear udder quarters are typically formed larger than the front udder quarters. Because a conventional teat cup cluster generally does not have separate activation of the milking vacuum for the individual teat cups, the result can be "over milking" of the diverse udder quarters for differing lengths of time. Excessive over-milking leads to an increased number of cells in the milk, however, as well as to possible damage to the udder quarter in question, as well as to cramping of the udder musculature. In order to take into account the problem of differently shaped udder quarters, often a pulling device is provided in connection with the teat cup cluster in such a way that a certain tilted positioning of the teat cup cluster can be selected during the milking or after the milking process has lasted a certain time. For this purpose, more tension is applied to an appropriate linkage, for example, a cable, in order to give the teat cup cluster a tilt directed forwards, in order consequently, as a result of the teat cup cluster movement, to exert a greater mechanical stimulation impulse on the rear teats and therefore udder quarters in comparison to that on the front udder quarters. This, however, requires corresponding manual intervention, which can lead to an increased expenditure of time when larger numbers of animals are milked.

A further problem of milk production when there are relatively large numbers of animals is presented by the more and more frequently seen milk blockade in sensitive animals, particularly among young animals, because these animals are presumably considerably more sensitive to stress than the older animals are. In order to increase the milk yield of these young animals to the capability determined by the animal's constitution, conventional milking techniques using milking parlours and teat cup clusters generally require a corresponding expenditure of time and effort, which in turn negatively affects the profitability of the overall operation.

In light of the problems that arise with semi-automatic milking using a milking parlour and teat cup cluster, a further object of the invention under consideration is to allow a movement of the teat cup cluster at the udder in a more efficient manner, in order consequently to structure the milking process in a manner closer to the natural one.

According to a first aspect, this object is solved by means of a retaining device for the manual removal of the teat cups, wherein this retaining device has a fastening device in order to fix the retaining device in place at a predetermined milking position. Furthermore, the retaining device is formed in such a way as to hold each teat cup in a position fixed relative to other teat cups during a first operational phase and to allow manual access and, during a second operational phase, to allow movement of each teat cup relative to the retaining device and relative to at least one other teat cup, in several directions.

The retaining device for teat cups according to the invention consequently makes it possible to fix the teat cups in place at a predetermined milking position during a first operational phase that, for example, can represent the period of time before the individual teat cups are attached to the teats, so that, in particular, the energy-sapping and/or health-impairing holding of a teat cup cluster under the udder can be avoided. Furthermore, the fixed position of the individual teat cups relative to one another during this first operational phase considerably reduces the risk of dirtying of the teat cup liners, for example, as a result of contact with the ground, so that, in particular, the milk quality and the health status of the animals themselves can be improved considerably even when inexperienced personnel are used. Furthermore, the retaining device according to the invention allows individual access to the teat cups during a second operational phase and allows the teat cups to be managed individually. Due to the relatively low expenditure of energy, it is therefore possible to work over longer periods of time at a high concentration level, as a result of which the work efficiency increases. In addition, because the work is made easier, other aspects of the milking process can be given more attention, such as the assessment of the animal's udder, etc.

In a further advantageous embodiment, the retaining device has a container into which the teat cups are inserted at least partially during the first operational phase. The container of the retaining device according to the invention can substantially contribute to a reduced mechanical load during the handling of the teat cups, as well as to improved hygiene conditions, because particularly the area of the teat cups introduced into the container is protected from mechanical loads and dirt. For example, when the teat cup cluster is transported from one milking parlour to another in the retaining device, it is possible to reach a standard of hygiene that is considerably higher than with an "open" design of the retaining device, because, for example, contact of the container wall with contaminated areas does not initially affect the teat cups and the contamination can also easily be removed from the container wall.

In a further advantageous embodiment, the retaining device has a guide device for guiding milk hoses during manual movement of the teat cups relative to the retaining device. The guide device consequently avoids uncontrolled movement of the flexible connection hoses that connect the teat cups to a milk line or a milk collection container, for example, while the teat cups are being attached to the teats or during the milking process, in which a swinging movement of the teat cups can occur. In particular, the guide device can be formed in such a way that the risk of the milk hoses coming into contact with the ground during the first operational phase, i.e., before the teat cups are attached to the teats, as well as during a second operational phase, i.e., during the attachment or during the milking process, is considerably reduced, as a result of which, on the one hand, the life cycle of these milk hoses is extended, because particularly the risk of being stepped on is minimized, and, on the other hand, dirtying of the milk hoses is kept down.

In a further advantageous development, the retaining device comprises a controllable vacuum switching mechanism that is formed in such a way as to apply an operating vacuum to each of the teat cups in a controllable manner. Using the vacuum switching mechanism, it is possible to reliably switch the operating vacuum in each of the teat cups on and off individually, so that the teat cups can be attached to the respective teats without interfering significantly with the operating vacuum.

In a preferred embodiment, the retaining device has one control switch in the vacuum switching mechanism for each of the teat cups. Because there is a control switch for each of the individual teat cups, an operator of the milking installation can switch the operating vacuum in each separate teat cup on and off selectively, so that the influence of the attachment or removal of the teat cups on the operating vacuum can be limited even further. Furthermore, the opportunity of removing the teat cups from the teats in a gentle way presents itself, because the operating vacuum at this teat cup can be switched off directly before the removal, wherein the process of the removal then leads to no breaks in the operating vacuum whatsoever, which would lead to the risk that the remaining teat cups fall off of the teats. Furthermore, the process of removing the teat cups can be carried out in a way that is more pleasant for the animal, because the suction effect of the operating vacuum can be switched off for the removal.

In a further embodiment, the vacuum switching mechanism is formed in such a way that the operating vacuum is switched depending on the distance of the teat cup from the retaining device. In this way, the process of attaching the teat cups can be even further simplified, because, for example, when the operator approaches the teat with the teat cup, the operating vacuum is switched on automatically, without assistance from the operator being necessary. Consequently, the attachment of the teat cup to the teat can, for example, be performed with one hand, so that the udder of the animal can simultaneously be stimulated.

In an advantageous further development, the retaining device comprises a multiple number of connectors that make possible a connection to one or more milk hoses that connect the retaining device to a milking installation, and to a vacuum line of the milking installation. The multiple connectors, which can be provided in the simplest construction merely as stubs onto which the corresponding hose ends are slid, make it possible to decouple the retaining device, and therefore the teat cups, from the rest of the milking installation in a simple and rapid way. For example, the connectors and corresponding hose ends can be formed in such a way that a sealed termination is given on the hose side and/or the connector side, so that, e.g., a milk hose can be decoupled with a simple motion of the hand, without impairing the operating vacuum in the rest of the installation.

Preferably the retaining device comprises hose sections, each of which can be connected at one end to a connector and at the other end to a separate teat cup. As a result of this construction, the retaining device can be seen as a connection piece between the milk line and a milk container of a milking installation and the teat cups, with respect to the flow. Consequently, the teat cups and/or the milk line can be decoupled efficiently without larger reconstruction of the milking installation being necessary. For example, one or more teat cups can be replaced rapidly, should this be necessary, for example, due to dirtying or contamination of the teat cups. Particularly if a vacuum switching mechanism is provided that can individually switch the operating vacuum on and off at each teat cup, a corresponding change can be carried out without there being any impairment of the milking process.

In a further advantageous embodiment, each hose section has at least one control hose section, which can be connected at one end to a teat cup and that is connected at the other end to a corresponding control connection of the retaining device. In this way, not only the milk and the operating vacuum can be transferred from the milk hoses of the milking installation to the teat cups via the retaining device, but also the control pulses necessary for the operation of the milking process. For example, typically, so-called pulsators are used that periodically apply atmospheric air and vacuum to the teat cups to control the milking process, so that these control pulses can also be coupled to the teat cups simply via the retaining device. For example, the connectors and the corresponding control lines and milk lines of a milking installation can be formed in such a way that the control lines and milk lines are connected only to the retaining device as soon as it is brought into position, so that the milking process can be started immediately. For example, the retaining device can have the fastening device in the form of an easy-to-attach support, so that the retaining device can rapidly be carried from one position to another, wherein particularly only the control hose and the milk hose then need to be connected and the installation is consequently ready for operation. At the same time, the retaining device also considerably simplifies the attachment of the teat cups to the teats compared to a conventional teat cup cluster, so that the milking of smaller numbers of animals is possible in a way that is relatively fatigue-free and hygienic, even if no milking parlour is present.

In a further advantageous embodiment, the fastening device has a holder in order to secure the retaining device to a milking parlour support. In this way, the retaining device according to the invention can be used in a manner compatible with existing milking parlours, wherein the previously mentioned advantages compared to conventional teat cup clusters can be achieved.

In a further embodiment, the fastening device is formed in such a way that it is adjustable, such that the longitudinal axes of the teat cups are aligned so that they are nearly horizontal. In this way, an especially favourable position of the retaining device can be set up, in which not only is the withdrawal of the teat cups during the attachment to the teats easy, wherein the risk of a dirtying or contamination of the teat cups by means of small particles of dirt whirled up into the air is small, which otherwise could penetrate into the milk line in the case of an essentially vertical alignment of the teat cups.

Preferably the fastening device is formed in such a way that the retaining device can be transferred from a first position that corresponds to the first operational phase into at least a second position for cleaning at least one area of the teat cups. As a result of this characteristic of the retaining device, this device can efficiently support the cleaning process of at least a portion of the teat cups, so that even during short phases, for example, between two milking processes, a cleaning, at least partially, of the teat cups is possible in a simple manner. Furthermore, the retaining device can also be oriented in the second position in such a way that a corresponding cleaning device can be easily attached, so that a thorough rinsing of the teat cups and the corresponding milk line is made possible after the completion of all milking processes.

Advantageously, the retaining device is formed in such a way that a position for intermediate disinfection of the teat cups is possible. Consequently, efficient rinsing of the teat cups, for reducing the transfer of germs from animal to animal, takes place. In this process, advantageous embodiments provide a container that holds the rinsing liquid, and using a corresponding line, can remove it in a controlled manner, so that contamination of the stall with chemical agents can be kept low.

In a further advantageous formation, the vacuum switching mechanism of the retaining device has a turn-off device that is formed to decouple a teat cup, individually and automatically, from the operating vacuum in the case of the loss of milking vacuum in that teat cup. With this turn-off device, it can consequently be ensured that, for example, in the event of a teat cup falling off of a teat, the other teat cups are nevertheless acted upon by the operating vacuum, so that the milking process on these teats can be continued or at least that the remaining teat cups are prevented from falling off. The turn-off device can be provided in other embodiments for also switching the operating vacuum on, for example, by means of attaching a manual control switch to the retaining device, wherein said control switch can be activated when a teat cup is attached to the teat, in order to switch the operating vacuum through to the teat cup.

In a further embodiment, at least one connector, which can, for example, be connected to the operating vacuum on one side and to a teat cup on the other side, is provided with a controllable valve. Due to the use of a controllable valve, a high degree of operating convenience can be achieved, because, for example, the operating vacuum can be switched in an efficient manner. For example, the valve can be provided in the form of an electric valve, so that a corresponding switch unit for activating the controllable valve can be arranged at a position that is optimal for the operation of the retaining device or for the milking process, wherein the location of the controllable valve can be placed in a position that is optimal for the milking process. For example, a corresponding switch element can be provided directly on the teat cup, so that it is possible to switch the operating vacuum on and off with one hand. It is also advantageous for the controllable valve to be provided as a pneumatically-operated valve, because corresponding valves, control lines, operating controls and the like have proven to be robust and reliable components in the area of milking technology.

In a further embodiment, the retaining device furthermore has a cleaning device that can be moved from a first cleaning position during the first operational phase, in which at least the head portion of the teat cup liner can be exposed to the action of a cleaning fluid, into a second position for the release of the teat cup for the second operational phase. A cleaning device formed in such a way makes possible efficient cleaning of at least the head portion of the teat cup liner, which can be exposed to increased contamination during the milking process. This cleaning process can be performed by providing the cleaning device at the retaining device even for relatively short time intervals, for example, between the milking processes of two animals, so that a contamination of the milk and a transmission of disease-causing germs to the udders of the animals can be considerably reduced, wherein no higher expenditure of labour or a higher level of training is required on the part of the operating personnel.

In a further formation, the cleaning device has a sealing element, in order in this way to seal off the teat cup liner interior when the retaining device is located in the cleaning position. A corresponding arrangement consequently allows the use of very efficient cleaning fluids, wherein the possibility of penetration into the milk line remains minimal.

In a further embodiment, the sealing element has at least one nozzle element, which serves to feed a cleaning fluid into the teat cup liner interior. Consequently, with a cleaning device formed in this way, the teat cup liner interior and downstream milk lines can also be efficiently rinsed and cleaned after the completion of the milking process, without any additional expenditure of labour being necessary. To this end, in, for example, some embodiments, a corresponding connector for the feed of one or more cleaning fluids to the cleaning device can be provided, so that a cleaning process can be carried out at any time without a large effort. For example, it is also possible to provide a discharge line or a discharge connector that serves the discharge of used cleaning fluids if only an outer rinsing of the teat cups or parts thereof is carried out.

In a further embodiment, a power supply unit is furthermore provided in the retaining device. The power supply unit can be formed in such a way that corresponding consumers, for example, pulsators, electric valves, control electronics and the like, are provided with suitable voltages. In this process, the power supply unit can be provided with power by means of connection to an external power supply system, or, in other embodiments, it can generate its own electric power, if, for example, no corresponding electric connection lines are available. For example, the power supply unit can be pneumatically driven, for example, by means of compressed air or by means of the operating vacuum, so that the necessary operating voltages can be provided without connection to external power.

In a further embodiment, a sensor element is provided in the retaining device, said sensor element being formed in such a way as to register the milk flow from at least one teat cup. As a result of this action, it is possible to inspect the milking process, wherein, for example, the flow quantity can be actively displayed and/or used for further control purposes. Advantageously, a corresponding sensor element is provided for each of the teat cups, so that each individual udder quarter can be monitored. For example, corresponding control electronics can be provided in the retaining device, said control electronics evaluating the one or more output signals of the sensor elements and accordingly controlling the milking process. For example, a warning can be output when the milk flow in one teat cup falls below a certain critical level, so that the teat cup can then be removed by an operator.

In further advantageous embodiments, a quality sensor element is furthermore provided in the retaining device, wherein said quality sensor element is formed to register at least one characteristic identifying the milk quality. By means of this device, the milking process can also be structured for inexperienced operating personnel in such a way that optimal milk quality, combined with increased animal health, is achieved. In particular, the quality sensor element, which is advantageously provided for each individual teat cup, can be connected to a corresponding evaluation controller, so that, e.g., the salt content of the milk is registered, in order to display to the operator whether, for example, an udder quarter should be milked more strongly in order in this way to prevent an emerging health disturbance in the udder quarter in question. Naturally it is also possible to register other characteristics that identify the milk quality, for example, the number and/or size of pus floccules and the like, and to use these for the further control of the milking process. If the retaining device has corresponding controllable valve elements, pulsators or the like, the output signals of the sensor elements can advantageously also be used in order to control the milking process in an automated manner, without intervention on the part of an operator.

In a further advantageous embodiment, the retaining device furthermore has a stimulation mechanism that is formed to act mechanically on the minimum of one milk hose and/or control hose that connects a teat cup to the retaining device during the second operational phase.

As a result of the stimulation mechanism, it is consequently possible to achieve a movement of the teat cup on the teat in a selective manner, so that a corresponding stimulation can take place, without it being necessary to oscillate a large mass at the udder of the animal, as is the case with conventional teat cup clusters with milking claws.

In a further embodiment, the stimulation mechanism has a drive element and an actuator element coupled to it, wherein the actuator element is in contact with the minimum of one milk hose and/or control hose during the milking. Consequently a construction optimised for the function can be achieved for the actuator element, independently of the drive element, so that optimal stimulation is achieved. For example, the actuator element can be attached to the retaining device in the form of a bracket or a plate in such a way that constant contact with the flexible milk hoses is achieved, wherein the bracket or plate can also simultaneously serve as a certain guide for the milk hoses or teat cups when these are removed from or returned into the retaining device. A corresponding advanced plate or advanced bracket can also be considered as an effective protective mechanism if, when the teat cups are handled or during the milking process, one or more teat cups fall(s) off, because then the bracket or the plate can shorten the effective length of the milk hose by bending it on an appropriate edge in such a way that direct contact of the teat cup with the ground is avoided in some cases. A corresponding actuator element can be provided for multiple teat cups or individually for each teat cup.

In other embodiments, the stimulation mechanism can have a drive element in the guide mechanism so that an individual mechanical action on each individual milk hose and therefore on each individual teat cup is made possible. For example, corresponding rolls or cylinders of the guide mechanism can be coupled to a motor or other drive means, so that short rotational movements of the roll or back-and-forth movements of the cylinder cause a corresponding stimulation effect by the teat cup attached to the teat.

In a further embodiment, the stimulation mechanism comprises a control mechanism that is formed to control the frequency of the mechanical action and/or the strength of the mechanical action. With the help of this control mechanism, it is possible to form the stimulation process efficiently, without external influences, such as a different distance from the animal to the retaining device, a changed orientation of the retaining device or the like, essentially exercising a negative influence on the stimulation process. For example, the control mechanism can be formed in such a way that the vibration behaviour of the teat cup cluster on the teat of the animal is detected and a suitable frequency and/or amplitude is selected on the basis of the detected vibration behaviour.

In a further embodiment, a mechanism for rhythmically pulling the hose sections is provided, so that during post-milking, an optimal position of the teat cups and a corresponding stimulus for the animal are given. In an advantageous embodiment, a clamping mechanism and a drive unit can be provided for this, so that the hose sections are clamped and then pulled by means of the drive mechanism, and consequently the teat cups with the teats are brought into a position that is desired for post-milking. The drive unit can be driven manually or it can be driven by the use of a suitable drive means, for example an electric motor or the like. Advantageously, the activation can take place in such a way that a rhythmic pulling appears at the teat cups, which, for example, can be achieved with the help of an eccentric disc in combination with a motor. In advantageous variants, the clamping mechanism is coupled to the stimulation mechanism, so that corresponding components of the stimulation mechanism can also be used for the post-milking. Consequently, for example, the bracket of the stimulation mechanism can be provided with a second bracket component that can be folded down, in order to clamp the hose sections tightly and then pull these, periodically, if needed, into a desired position, wherein the drive unit of the stimulation mechanism is then formed so that it can drive into the position.

In further embodiments, devices are provided that guarantee an adjustment of the teat cups in the retaining device in an predetermined orientation so that corresponding cleaning mechanisms can be connected to the teat cups, wherein said cleaning mechanisms require that the position of the teat cups remains constant.

In further variants, at least areas of the hose connections that connect the teat cups to the operating vacuum or other sources can be designed in their arrangement so that the form of the hose connections, in connection with a corresponding guiding, results in a high level of stability against the twisting of the hose connection. For example, suitable cross-sectional profiling can serve to make possible greater resistance to torsional forces in the retaining device. In particular, a corresponding profiling can be achieved by means of the integration of one or more control lines and/or stimulation lines into the milk-conducting hose.

According to a further aspect of the invention under consideration, a teat cup cluster is provided that comprises a multiple number of teat cups, a multiple number of connection hoses that are connected to the teat cups and a retaining device.

On the basis of the retaining device according to the invention, the teat cup cluster can have a fundamentally simpler construction than that of conventional teat cup clusters, wherein particularly a heavy, unwieldy milking claw can be avoided in the moving parts of the teat cup cluster. As explained earlier, in this way the attachment of the teat cups can take place in an essentially more convenient manner, because only the weight of a single teat cup must be handled, as contrasted to the several kilograms of a conventional teat cup cluster.

The connection hoses in this connection can have milk-conducting lines, control lines and stimulation lines, wherein corresponding lines can be completely or partially coupled for a teat cup.

In an advantageous further development, each connection hose has at least one milk-conducting line and a control line in a shared hose sheath. This arrangement keeps the number of necessary hose connections small. Furthermore, such a formation allows the manufacturing effort to be kept low if the connection hose is manufactured with at least the milk-conducting line and the control line in a joint manufacture procedure. Furthermore, lines can also be integrated into the control lines that are provided for activating the vacuum switching mechanism, so that, in spite of these additional lines, the number of connection hoses is not increased. It is also possible to provide electric lines within the hose sheathing so that corresponding protection is given for the electric lines.

Advantageously, each connection hose or each teat cup has an operating control in order at least to make it possible to switch the milking vacuum to each teat cup. A corresponding arrangement of a switch element at the teat cup or at the accompanying connection hose allows extremely convenient attachment and removal of the teat cups, because it is possible to switch the milking vacuum on and off immediately before the attachment or removal of the teat cup, optionally with only one hand.

According to a further aspect of the invention under consideration, a milking parlour is provided with a support for holding and guiding a milk line and a control line, multiple teat cups that are in a fluid connection with the milk line and the control line and a retaining device. As a result of the use of the retaining device according to the invention, corresponding advantages, as already presented, result for the milking parlour when animals are milked.

Advantageously, the retaining device is attached to the support by means of the fastening device, wherein in advantageous further developments, the support and/or the fastening device allow a swiveling of the retaining device in several directions, in order to achieve an optimised operating and/or cleaning position in this way.

In a further advantageous embodiment, a hose guide, attached to the support, is provided in the milking parlour, wherein the hose guide is formed to produce the fluid connection between the teat cup and the milk line in the first and second operational phase. For example, corresponding devices for guiding, holding and adjusting corresponding milk hoses of conventional support systems for milking parlours can also be used in combination with the retaining device according to the invention, so that a high degree of compatibility with existing systems is achieved.

According to the invention, in an additional aspect, an actuator for inciting a movement of a teat cup cluster is provided, wherein the actuator has a holding device for fastening the actuator in a position at a distance from the teat cup cluster. Furthermore, the actuator comprises an actuator element that can be coupled to a flexible component that is connected to the teat cup cluster during the milking process, in order to produce movement in the flexible component in at least one direction.

The actuator according to the invention can consequently be brought into any suitable position so that a coupling to the teat cup cluster can take place via a flexible component, for example, a milk hose, a pulsator hose or the like, so that the corresponding movement transferred to the flexible component also affects the teat cup cluster. By means of the actuator according to the invention, it is consequently possible to achieve, to a certain, desired degree, a decoupling of the pulsation needed for the milking from a movement of the teat cup cluster needed for another effect. For example, using the actuator according to the invention, efficient stimulation can take place before the actual milking process, without a manual stimulation phase being necessary. To this end, the actuator can, for example, be formed in such a way as to cause a corresponding movement of the teat cup cluster at the udder for a desired length of time, for example, one minute or longer, so that the hormone necessary for milking can be effective in the udder. For this purpose, it can be advantageous to cease the pulsation completely during this stimulation phase and to keep the teat canal of the teat closed by folding in the teat cup liner, so that essentially no milk is milked off during the stimulation phase. If the minimum of one direction in which the actuator element can move the flexible component is oriented in such a way that a desired tilting of the teat cup cluster at the udder is achieved, the actuator according to the invention can also be efficiently used for tilting the teat cup cluster, in order to carry out various stimulating pulses during the milking process on, e.g., the front and rear udder quarters. In addition, by using the actuator according to the invention, selected movements can be brought about at the teat cup cluster during the actual milking process, so that stimulating milking can be achieved efficiently. Stimulating milking is particularly important during the first three months after the birth of a calf, in order to generate the hormone prolactin in a sufficient quantity for the long-term activation of the milk-forming cells. When there is a sufficient quantity of the activation hormone prolactin, which can be achieved by selective stimulating milking, the genetic potential of the animal is utilized, which therefore, in combination with improved udder health, contributes to a higher milk yield.

The actuator according to the invention can also effect a relaxation of the smooth udder musculature during the automatic post-milking, so that cramping of the musculature, which can, for example, be caused by the penetration of the vacuum into the teat, is avoided. In this way, the overall milk yield is improved, wherein nevertheless more milk is achieved in less time with a reduced effort on the part of the trained personnel. In particular, the actuator according to the invention can structure the distribution of the oxytocin on the udder in a more uniform manner as a result of a more selective movement of the teat cup cluster at the udder, so that, in combination with improved relaxation of the udder musculature, a higher degree of removal of the milk can be achieved in an overall reduced milking time. As a result of the improved removal of the milk, the milk production is kept at a high level, on the one hand, and, on the other, undesired milk components, e.g., pathogenic germs, etc., are effectively flushed out of the upper regions of the udder quarters to a greater degree. The milk blockade, particularly of young animals, can also be more effectively countered, because the actuator according to the invention makes possible a gentler stimulation that is truer to nature. In particular, a prodding stimulation can be achieved with the appropriate orientation of the direction of the actuator element movement. For example, the actuator element can be formed in such a way that a movement in the longitudinal direction of the flexible component, for example, the milk hose, is brought about, so that as a result, a movement towards the base of the teat is brought about at the teat cups in general. By the removal or reduction of the "hammering" of the teat found in conventional, pulsator-induced stimulation, damage to the inner teat lining can be decisively reduced.

A further advantage of the actuator according to the invention consists of the fact that this can be used in already existing milking installations, because the retaining device makes possible an appropriate attachment of the actuator at a suitable position, for example, at the linkage or holder arm of a milking parlour in such a way that it makes possible mechanical contact with a flexible component, for example, the milk hose and/or the pulsator hose. An attachment of the actuator according to the invention to a pulling device is also possible for adjusting the tilt of the teat cup cluster with respect to the animal udder. By means of a corresponding arrangement, it is possible to bring about both stimulating movements at the animal's udder and a movement that is necessary for positioning the teat cups with respect to the animal udder. Naturally, it is also possible for the two movements to be combined, so that a corresponding stimulating movement can be effected around a desired "middle position", which corresponds to a desired angle of incidence of the teat cups.

In a further advantageous embodiment, the actuator comprises a controller, which is functionally connected to the actuator element and which is formed in such a way as to cause controlled movement in the actuator element.

The provision of a controller makes possible a higher level of automation of the milking process, in that, for example, the movement can be controlled over time by means of the controller. For example, the movement necessary for effective pre-stimulation can be controlled by means of the controller in such a way that the minimum time necessary for distributing and transporting the oxytocin can be maintained reliably, without manual intervention being necessary.

In a further preferred embodiment, the controller is formed in such a way as to determine the intensity and/or progression over time of the controlled movement. This formation of the controller makes possible a high level of flexibility in the performance of the milking process, because, for example, the chronological progression and the intensity of the stimulation can be stipulated by means of the controller. For example, another type of movement and therefore of stimulation can be executed during the pre-stimulation for a prescribed length of time, for example, at least one minute, which then passes into less intensive stimulation during the actual milking process. In particular, it can be advantageous to generate prodding stimulation pulses using the controller in order thereby to simulate the corresponding prodding of the calf during a natural suckling process.

In an advantageous further development of the invention under consideration, the controller is furthermore formed for communicating with a sensor device and for controlling the actuator element on the basis of a signal of the sensor device.

Corresponding sensors are often present in the milking installation for registering certain features that are characteristic for the milking process. For example, often a milk flow sensor is provided in order to monitor the progress of the milking process. Furthermore, sensors are often used in order to record one or more characteristics of the removed milk. For example, the number of pus floccules can be determined during the milking, or the electrical conductivity of the milk can be measured in order to thereby obtain a measure for the salt content in the milk, which in turn can give information about the health status of the udder. By controlling the actuator element on the basis of a corresponding sensor signal, the milking process can be even more efficiently designed by means of the actuator according to the invention, because, for example, the type and/or intensity of the stimulation during the milking can be appropriately adjusted or, for example, the orientation of the teat cup cluster at the udder can be changed. For example, an abrupt change in the milk flow curve can indicate that udder quarters have already been milked empty, or are close to being so, so that a corresponding new orientation of the teat cup cluster can lead to less stimulation and therefore to lower milkability in these udder quarters. Naturally the actuator according to the invention can also be operated on the basis of other sensor elements.

In a further advantageous embodiment, the sensor device is formed to generate a signal representative of the status of the milking process and/or of the stimulation status of an animal.

As previously mentioned, where applicable, the status of the milking process can be determined using the floccules content and/or salt content of the removed milk. In advantageous embodiments, a milk flow sensor is provided with which the progress of the milk flow over time can be registered. In particularly advantageous examples, the milk flow sensor is formed to register the milk flow virtually continuously, so that as a result, the so-called relaxation rhythms of the animal can also be determined. With adequate stimulation during the milking, the milk flow curve shows a characteristic swelling and ebbing of the milk flow, from which the relaxation status and therefore the stimulation status of the animal can be concluded. Using the milk flow curve, a control of the type and/or intensity of the movement brought about on the teat cup cluster by the actuator element can consequently result. For example, by means of a stronger movement and/or a change in the frequency when there is a deviation in the milk flow curve from a target value, a different type of stimulation can be selected during the milking. In advantageous embodiments, corresponding reference data can be prepared individually for separate animals for this purpose, and said data can then be used for controlling the actuator element. For instance, when there is a deviation from the reference data, which can, for example be stored in a memory device as a reference curve, data points, etc., a change in the teat cup cluster movement can be brought about. For example, when there is a premature drop in the milk flow as compared to the reference data, increased stimulation or another tilting position of the teat cup cluster could be used. In order to keep the reference data always at the latest level, the current milk flow data can be included in the reference data, for example, in the form of a sliding average or similar algorithms. In other cases, sensor devices can be provided that display the stimulation status of the animal, so that, for example, the duration and/or intensity of the stimulating movement brought about by the actuator element can be appropriately adjusted. A corresponding sensor element that registers the stimulation status can comprise a device that, for example, registers the kicking frequency and/or a tail movement, for example, lifting of the tail, the oxytocin content of the blood or the condition of the teat.

Sensor devices that ascertain, for example, the kicking frequency or the movement of the animal's tail, can be based on various concepts; for example, for a sensor device for the tail position, a device for measuring the tilt, for example, a gradient switch, can be provided. Corresponding sensor elements are advantageously designed for wireless communication and can be left on the animals for longer lengths of time, so that, where required, other information can also be retrieved and used for monitoring or evaluation purposes. For example, the actuator according to the invention can be formed for wireless communication with a corresponding sensor element on the animal's tail, in order thereby to monitor the effectiveness of the stimulation during the pre-stimulation phase and, where required, adjust the stimulating movement appropriately. In other examples, a corresponding sensor device that detects the level of excitation in the teat can be provided in one or more teat cups. Because typically, in the presence of successful stimulation of the teats, these being erect, this condition can be recorded in the teat cup, for example, by a pressure-sensitive component on or in the teat cup liner. Furthermore, the kicking frequency of the animals during the milking process can provide information on whether the milking process is currently being perceived as unpleasant by the animal. On the basis of corresponding signals, the stimulating movement and/or the position of the teat cup cluster on the udder can then be readjusted. In other embodiments, naturally two or more sensor devices with corresponding signals can be used, in order to obtain a clearer recognition of the stimulation status and to make it possible to react accordingly, using the actuator.

In a further advantageous embodiment, the actuator is furthermore formed in such a way as to control a pulsator connected to the teat cup cluster.

In this way, the milking process can be structured more efficiently, because the movement, for example, the stimulation movement, in the teat cup cluster can be efficiently coordinated with the operation of the pulsator. A control step can, for example, be undertaken in such a way that only after the completion of the pre-stimulation phase is the pulsator activated in such a way as to start the actual milking process. For example, a permanent folding of the teat cup liner, advantageously with only slight application of outside pressure and only at low operating vacuum, can be provided by the actuator during the stimulation phase, and only after the corresponding stimulation time has expired is the pulsator then started by the actuator, in order to get the actual milking process going. Particularly when the controller of the actuator is connected to corresponding sensors that show the stimulation status of the animal, it is possible for a highly efficient coordination of the pulsator and actuator to take place, because then the milking process can be reliably triggered only after the animal is appropriately ready for milking. Naturally other sequences of the milking process are possible by means of the coordination of the actuator and the pulsator. For example, it can possibly be advantageous to interrupt the milking process for a brief time, as required, and to carry out a more intensive or appropriately structured stimulation phase, in order, for example, to raise the oxytocin level and prolactin level again, without first completely sucking out the milk in the teat cisterns with the result of causing cramping of the udder musculature due to the penetrating vacuum.

In a further embodiment, the actuator is formed in such a way as to control a folding frequency and/or a pressurization of a teat cup liner activated pneumatically by the pulsator, at least during a stimulation period of the pulsator.

By having the actuator according to the invention be able to directly access the frequency and/or pressurization during the folding of the teat cup liner, very flexible coordination of the functions of the actuator and the pulsator is possible. For example, during the pre-stimulation, the folding frequency can be selected to be relatively high with relatively low pressurization, so that the mucous walls of the teat interior are not damaged, and removal of the teat cistern milk during the stimulation phase is prevented, wherein a certain degree of stimulation of the teat is nevertheless achieved. At the same time, the actuator can incite an additional movement, for example a prodding movement, so that, in combination, a more efficient stimulation is achieved, wherein the coordination of both devices, i.e., the pulsator and the actuator, is advantageously determined by only one device, so that a reliable course of the entire milking process is always given. Furthermore, this embodiment makes it possible to structure the milking process more flexibly than is possible using corresponding individual activations of the pulsator and the actuator. In particular, the interaction of the pulsator and the actuator can also improve the stimulation throughout the entire milking process, so that as a result of this stimulating milking, milk production and udder health can be increased over the long run.

In a further advantageous embodiment, the actuator is furthermore formed to change a tilt of the longitudinal axes of the teat cups of the teat cup cluster with respect to the animal udder during the milking process.

As was already explained, it can be advantageous to adjust the tilt of the teat cups to a desired value during the milking process or during certain phases of the milking process, in order to achieve a modified stimulation of diverse udder quarters in this way. In this process, a corresponding modification of the tilt can be achieved by, for example, generating a pull on a milk hose or a pulsator hose or a pull on the corresponding pulling device. The adjustment of the tilt can take place in this respect by means of manual activation of a corresponding switching button or similar operating control, also by remote-control and/or automatically, wherein, where applicable, the tilt adjustment can also take place on the basis of sensor signals that represent the status of the milking process and/or the stimulation status.

In a further advantageous embodiment, the actuator element is formed in such a way as to give the flexible component a movement at least in a second direction, linearly independent of the first direction.

On the basis of this circuit of the actuator element, it is possible to bring about stimulating movements of the teat cup cluster on the udder in a very flexible manner, so that overall, an improved stimulation effect is achieved.

In a further embodiment, the controller is furthermore formed in such a way as to assess a deflection effected on the teat cup cluster by the actuator element for at least two different movements of the actuator element and to carry out the activation of the actuator element on the basis of the assessment.

A corresponding formation of the actuator consequently allows the effect of the movement of the actuator element to be evaluated and the further activation of the actuator element to be carried out depending on this evaluation. For example, the type of movement that is started by the actuator element and that results at the teat cup cluster can depend heavily on the condition of the mechanical system, i.e., the flexible component, the teat cup cluster, the udder and the like, so that a stimulation movement of the actuator element can be selected that is favourable for the mechanical system in question. Consequently, it is possible, for example, by registering the energy needed to move the actuator element at a given amplitude, to determine a resonant range of the mechanical system in order in this way to very efficiently bring about a movement at the teat cup cluster.

In a further embodiment, the actuator element can be coupled to a flexible milk hose and/or a flexible pulsator hose, which are in a fluid connection with the teat cup cluster, for inciting the movement.

In this way, the actuator can be mechanically connected to the teat cup cluster in a relatively simple manner, by means of fixing it in place, for example, on a milking arm or a milking bar by means of the retaining device, and by mechanically coupling the movable actuator element to one of the connection lines. For this purpose, depending on the condition of the actuator element, a corresponding fastening device can be provided in such a way that the milk hose and/or the pulsator hose can be connected to the movable actuator element in a rapid and uncomplicated manner.

In a further advantageous embodiment, the actuator element is formed in such a way that it can be coupled to a device that is provided for adjusting the orientation of the teat cups relative to the udder.

As was already mentioned previously, it can be advantageous to adjust the mechanical load and thereby the stimulating effect that is brought about on the individual udder quarters by the teat cup cluster according to the conditions of the animal or according to the milking curve, so that it is possible to remove the milk from the individual udder quarters in a manner that is as uniform as possible. In conventional milking parlours, corresponding milking arms or pulling devices are provided for this in such a way that, by means of a corresponding pull, the longitudinal axis of the teat cups can be more or less deflected from the vertical position. According to the invention, the actuator element is now formed in such a way that it can be coupled to a corresponding pulling device, so that a movement of the teat cup cluster on the udder is transferred via the mechanical movement of the actuator element and via the pulling device. At the same time, in some embodiments, the tilt of the teat cups can generally be adjusted by means of the actuator according to the invention, wherein additionally or alternatively, a stimulating movement of the teat cup cluster can also be incited. For example, the position of the teat cups can also be tracked in a suitable manner during the milking process, wherein the tracking can take place on the basis of a pre-selected course and/or on the basis of sensor signals and/or as a result of the initiative of an operator.

In an advantageous further development, the actuator element comprises a pneumatic driving device. By means of a pneumatic driving device, a relatively simply mechanical construction can be realized with comparably little effort in supplying the driving device. Because, particularly, pneumatically-operated devices are used in a milking installation, corresponding devices are, as a rule, available for the supply of a pneumatic device of that type, and can also be used for supplying the pneumatic driving device with compressed air or vacuum.

In a further embodiment, the actuator element comprises an electric driving device. Electric driving devices are available in an economic and varied arrangement and consequently allow a compact, reliable mechanical activation of the actuator element. Particularly in combination with corresponding power electronics, a high level of flexibility can be achieved for the mechanical movement of the actuator element, for example, with regard to the frequency and/or intensity of a mechanical deflection.

In a further embodiment, a pneumatically driven converter is furthermore provided, in order to provide electrical energy for the supply of one or more components. Using a pneumatically-driven converter of such a type, it is possible, for example, to generate the supply voltage for a controller and/or sensor elements and/or display elements and/or communication devices, wherein only a supply of compressed air or vacuum to the actuator is to be provided, so that the effort for an installation of the actuator according to the invention remains low, even in existing milking installations. In other embodiments, an electromagnetic converter can be provided that is mechanically coupled to the actuator element, so that an assessment of the mechanical movement of the actuator element is possible on the basis of the electrical energy generated by the converter. With an appropriate design, the energy generated for the assessment of the mechanical movement of the actuator element can also additionally be used for supplying one or more components of the actuator or sensor components connected thereto. For example, using the electromagnetic converter, the actually reached deflection and/or frequency of the movement of the actuator element can be registered and, where applicable, used for finding resonant areas of the entire mechanical system.

According to a further aspect of the invention under consideration, a milking installation for milking animals by machine comprises a vacuum system that is formed to provide a vacuum necessary for suctioning milk. Furthermore, the milking installation comprises a teat cup cluster with a multiple number of teat cups that are in a fluid connection with the vacuum system via first lines that are flexible at least in sections. Furthermore, a pulsator device is provided that is in a fluid connection with the teat cups via a second line, flexible in sections, where said pulsator device is formed in such a way as to effect a folding of a teat cup liner in each of the teat cups in a controlled manner. Finally, the milking installation comprises an actuator in accordance with one of the preceding embodiments.

This means that the milking installation according to the invention has an actuator that is capable of effecting a movement of the teat cup cluster on the udder, in addition to the conventional pulsator, in order consequently to structure the milking process more efficiently by means of additional stimulation and/or by modifying the angle of tilt of the teat cup cluster. The previously listed advantages are some of the advantages that can be achieved by means of the actuator.

In a further embodiment, a pulling device is provided for adjusting an angle of tilt of the teat cups on the udder, wherein the actuator is mechanically coupled to the pulling device. With an appropriate arrangement, it is possible to reach not only more efficient stimulation, but also automated adjustment of the tilt of the teat cup cluster on the udder.

In a further advantageous embodiment, the milking installation has a control device that is at least functionally connected to the actuator and that is formed so as to cause the actuator to produce a controlled movement of the actuator element.

The provision of a corresponding control device consequently allows a high degree of flexibility in the selection of a desired stimulation movement. For example, a stipulated stimulation sequence can be implemented in the control device, so that a corresponding stimulation program runs on each animal in a reliable and automated manner. In other examples, the control device can be formed in such a way that the stimulation sequence can be changed easily, so that peculiarities and/or events specific to an animal can be taken into consideration in the milking process. In this connection, the control device can be contained in any component of the milking installation, for example, the actuator, or it can exist as a single device that is connected to the actuator. In one embodiment, a wireless communication device can be provided in the control device and the actuator, so that an uncomplicated connection of the control device is possible. For example, the actuator can be formed in such a way that it follows a stipulated sequence and carries out an appropriate change in the movement sequence only as needed, via a command transmitted wirelessly by the control device. In this way, a single person can monitor the milking process for a number of animals and, by remote control, intervene in the corresponding milking process if, for example, a number of teat cup clusters are provided with actuators in combination. At the same time, each separate actuator can be assigned a unique coding, so that it is possible to access a very specific actuator selectively, via the control device. For example, the milker could observe that the front udder quarters of an animal have already been milked relatively empty, while the rear udder quarters still display a considerably higher level of milk, so that the milker can then change, for example, the tilt of the teat cup cluster by means of an appropriate command transmitted wirelessly to the corresponding actuator, so that the teats of the rear udder quarter experience a higher mechanical load. Naturally, other procedural sequences can also be executed via a wireless connection of a controller, such as adjusting the stimulating movement by selecting a desired frequency and/or intensity.

In a further advantageous embodiment, the milking installation has a sensor device for recording a characteristic that is relevant for the milking process.

By using a sensor device of this type, it is possible to structure the milking process even more efficiently, because appropriate information is available from the sensor device, at least at times. For example, the sensor device can register characteristics related to the milk quality and/or milk quantity and/or the animal's level of excitation and/or the type or intensity of the teat cup cluster on the udder and the like.

In a further advantageous embodiment, the control device is formed in such a way as to receive a sensor signal from the sensor device and to control the actuator on the basis of the sensor signal. In this way, an extremely efficient use of the actuator according to the invention is achieved, because the movement of the teat cup cluster on the udder can be individually adapted, depending on the condition at the time.

In a further advantageous embodiment, the control device is functionally connected to the pulsator, and formed in such a way as to control the operation of the pulsator. A coordination of the function of the pulsator and of the actuator can be achieved with this embodiment, so that, for example, an undesired removal of the teat cistern milk can be prevented during the pre-stimulation phase.

In a further advantageous embodiment, the sensor device and the control device are formed in such a way that they can communicate wirelessly. In this way, an uncomplicated connection of the sensor device and controller can be achieved, so that, in use under real conditions, a high degree of user-friendliness is achieved. In this connection, the sensor device can be structured in some embodiments in such a way that it has a corresponding power supply that allows operation over a long period of time, without it being necessary to carry out maintenance work on the sensor device. For example, a small converter, for example, in the form of an electromagnetic converter, can be provided that is formed for converting, for example, mechanical kinetic energy into electrical energy, in order in this way to cover at least a portion of the energy requirement of the sensor device.

In a further embodiment, the sensor device is formed so as to generate a sensor signal representative of the status of the milking process and/or for the stimulation status of an animal. Using a corresponding sensor device, the stimulation of the animal can consequently be carried out in a very individual manner using the actuator. For example, the pre-stimulation can be performed until such a time as the desired level of excitation is reached in the animal, wherein the condition of the animal is monitored even during the milking process and, if required, can be raised to a desired level again by means of stronger or modified stimulation. In this way, a higher level of removal of the milk can be achieved in combination with a shortened total milking time. In order to monitor, for example, the status of the milking process, the sensor device can have a milk quantity measuring device and/or a milk quality measuring device, for example, in the form of an instrument for determining the milk flow, the salt content, etc., and the like. The milk flow sensor is advantageously designed for a high sampling rate or virtually continuous measuring, so that the previously described relaxation rhythms can be registered, said relaxation rhythms allowing conclusions on the muscle tension and therefore the stimulation effect, and it being possible to use said relaxation rhythms for controlling the stimulation process directly. In order to monitor or register the stimulation status of the animal with respect to other behaviours, the sensor device can have corresponding sensor elements that, for example, detect the kicking frequency of the animal during the milking process, register the tilt status of the tail, because often the animal raises the tail after it has reached a certain milkability, detect the teats' excitation level, etc. Sensors for the kicking load and the tilt of the tail can, for example, be attached to the legs or the tail simply by means of elastic straps. Such sensors are preferably formed as wireless sensor devices, so that the transfer of data to the controller is possible without problems. Corresponding sensor devices can also be attached to the corresponding animal for long-term use, in which case they are then formed in such a way that a long-term power supply is available, so that corresponding data can also, where applicable, be gathered and used for other purposes.

In a further embodiment, the sensor device is formed in such a way as to record a movement of the teat cup cluster or a part of the teat cup cluster. In this way, the movement of the actuator element that is coupled to the flexible component actually achieved at the teat cup cluster can be monitored, so that, on the basis of the recorded movement, a corresponding adjustment of the actuator movement is then possible. Suitable speed sensors, acceleration sensors, inclination sensors and the like can be used for this purpose.

The control device is advantageously formed in such a way as to control the actuator element on the basis of the registered movement.

In a further advantageous embodiment, the control device is formed in such a way as to assess the deflection effected on the teat cup cluster by the actuator element for at least two different movements of the actuator element, and to execute the activation of the actuator element on the basis of the assessment. In this way, a type of movement favourable to the stimulation can be detected by the control device and the actuator can be appropriately activated. In particular, in this way, differences in the mechanical behaviour during the incitement of a movement of the teat cup cluster on the udder due to different components and conditions, such as different lengths of the milk hoses, different milking claws, etc., can be offset.

These and further advantageous embodiments can be taken from the attached patent claims, as well as from the following detailed description.

Further embodiments will now be described, by way of example, with reference to the accompanying drawings, in which:

FIG. 1a schematically shows a conventional teat cup cluster;

FIG. 1b depicts a section of a conventional milking parlour with a conventional teat cup cluster, in the operating position;

FIG. 2a schematically shows a milking parlour with a retaining device, in a perspective view according to the embodiment under consideration;

FIG. 2b to 2e schematically show further embodiments of the retaining device according to the invention, with exemplified guide devices for guiding milk hoses;

FIG. 2f and 2g show exemplified embodiments for switching the operating vacuum on and off individually;

FIG. 2h schematically depicts a turn-off device for individually switching off the operating vacuum when there is a drop in the milking vacuum at the teat;

FIG. 3a shows a milking parlour with a retaining device according to the invention, which furthermore has a stimulation mechanism;

FIG. 3b to 3e schematically depict further embodiments of a retaining device according to the invention with corresponding stimulation mechanisms;

FIG. 4a and 4b schematically show a cleaning device that is provided on the retaining device according to the invention;

Figure 5:
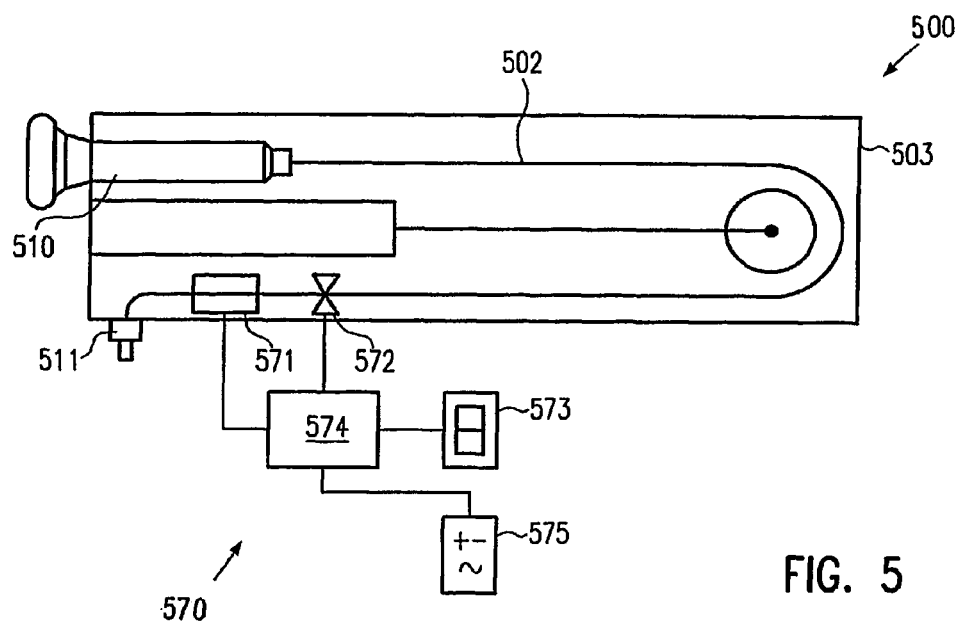
Figure 6A:
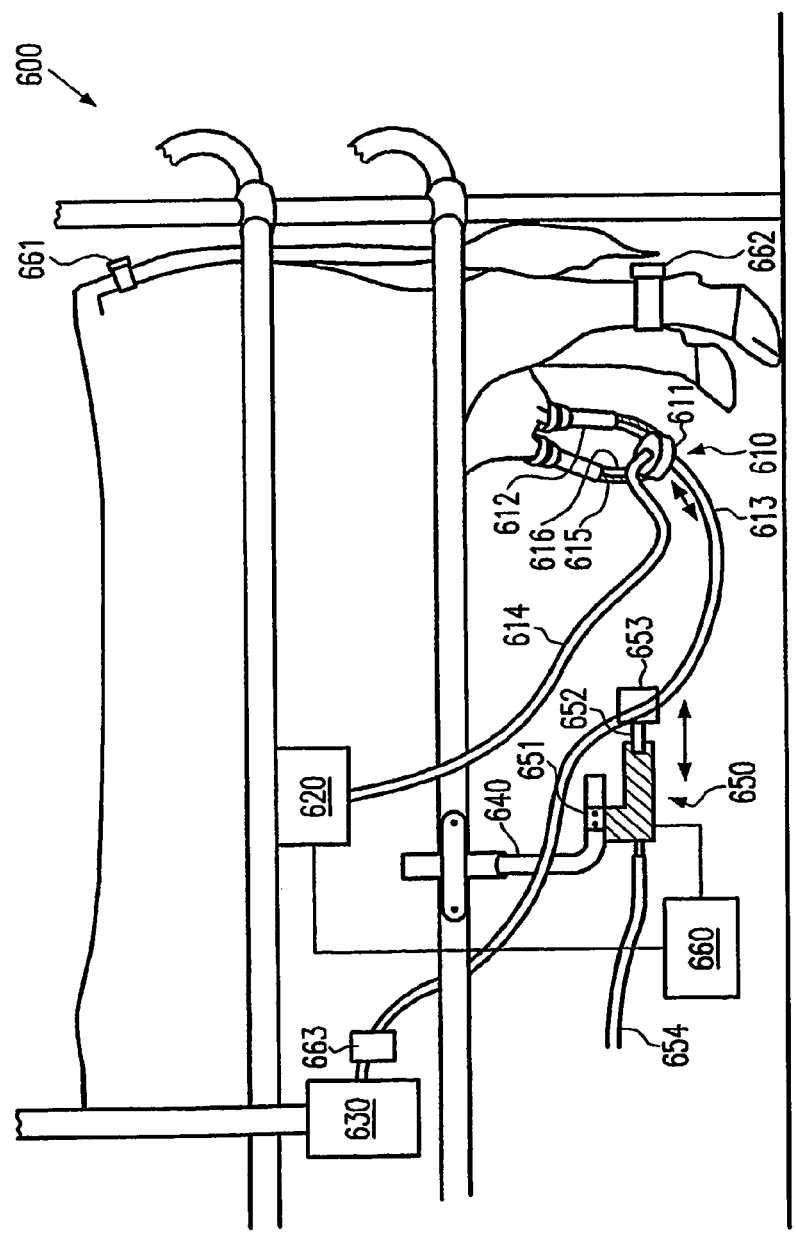
Figure 6B:
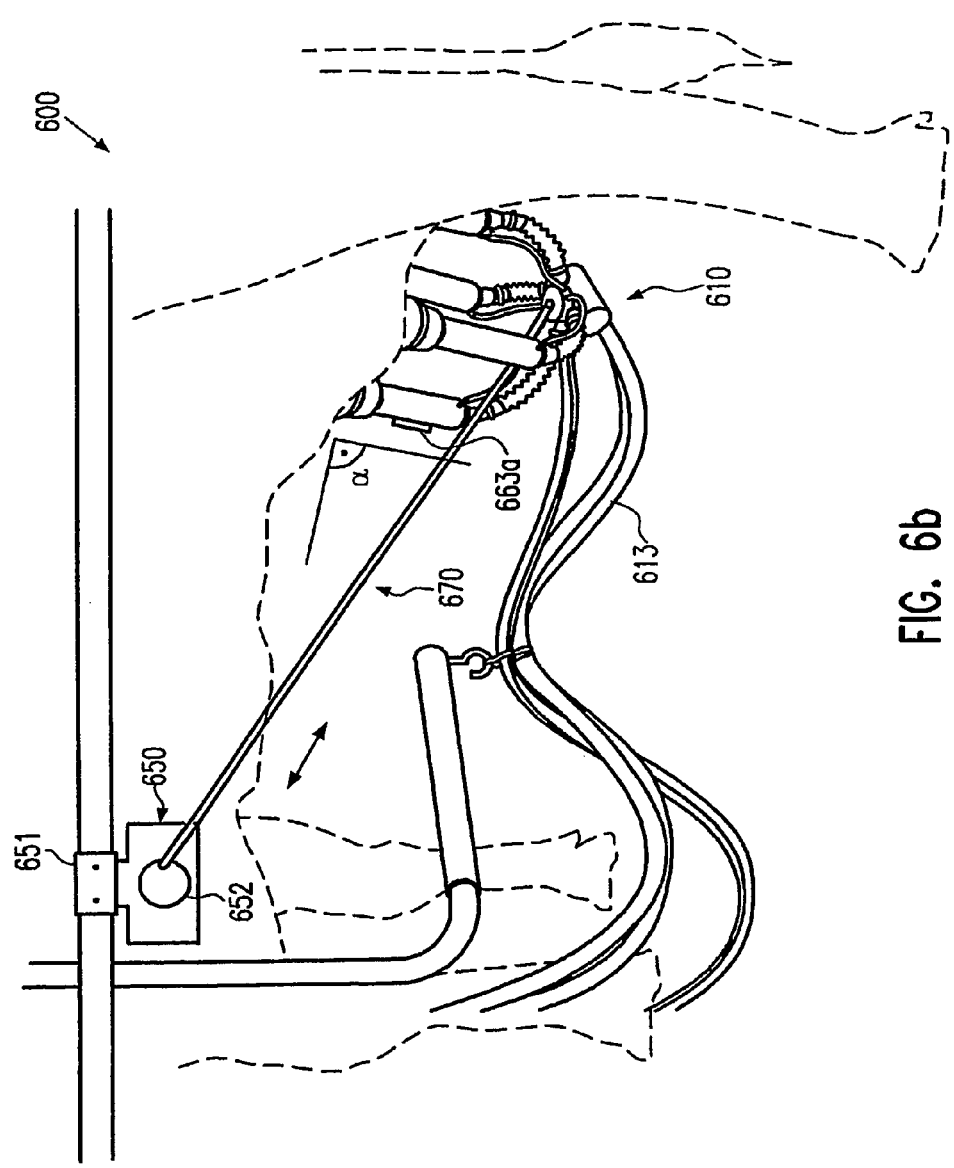
Figure 6C:
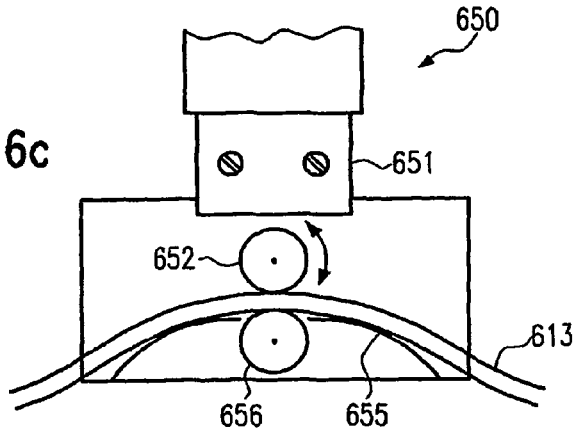
Figure 6D:
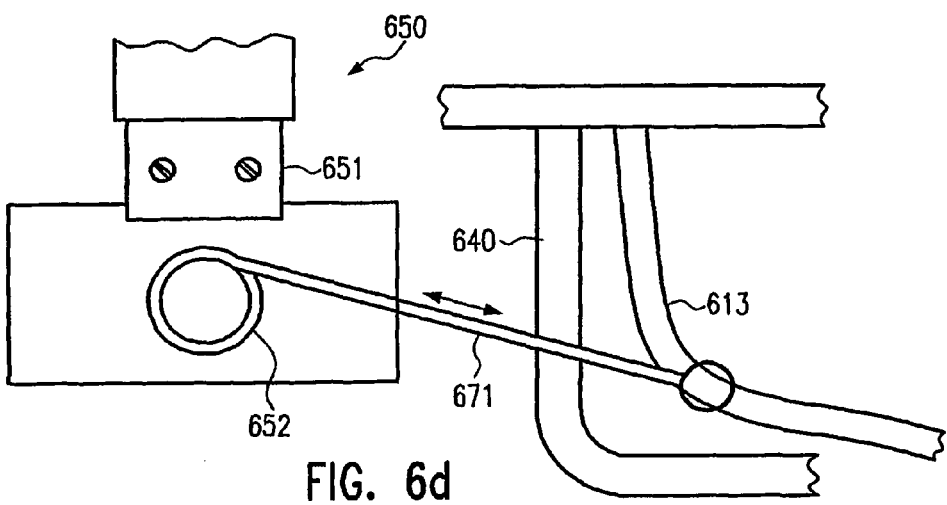
Figure 6E:
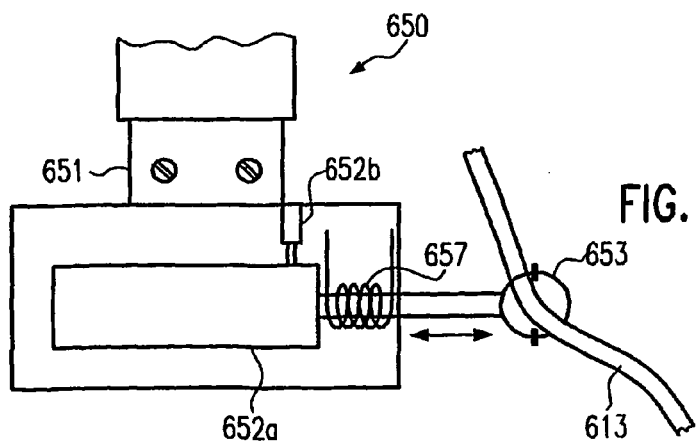

FIG. 5 schematically shows a further embodiment of the retaining device according to the invention, wherein sensor elements and control electronics are provided;

FIG. 6a shows a milking installation with an actuator according to the invention according to clear embodiments;

FIG. 6b depicts a portion of a milking installation, wherein the actuator is used for selecting an angle of tilt for the teat cup cluster; and FIG. 6c to 6e show clear examples of actuators with corresponding actuator elements.

Figure 1A:
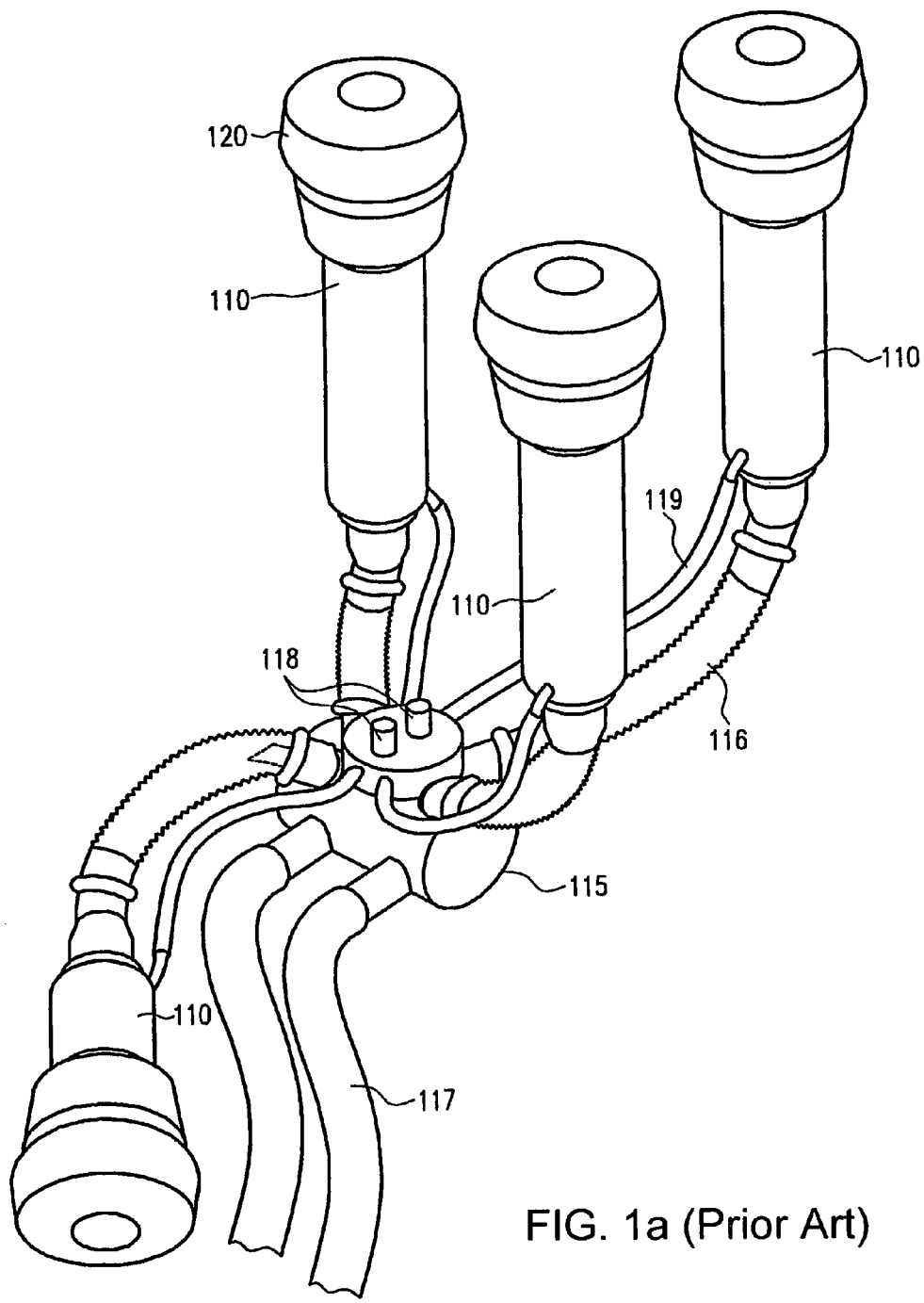
Figure 1B:
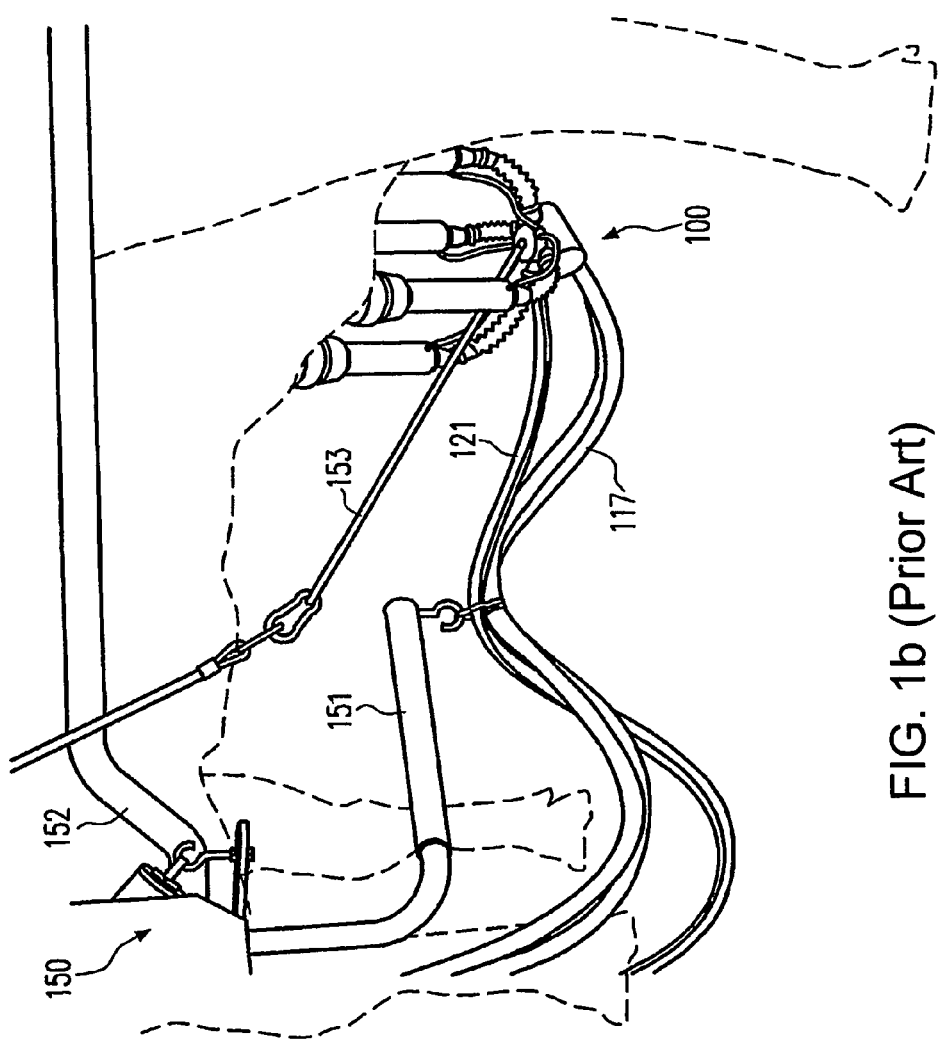
Figure 2A:
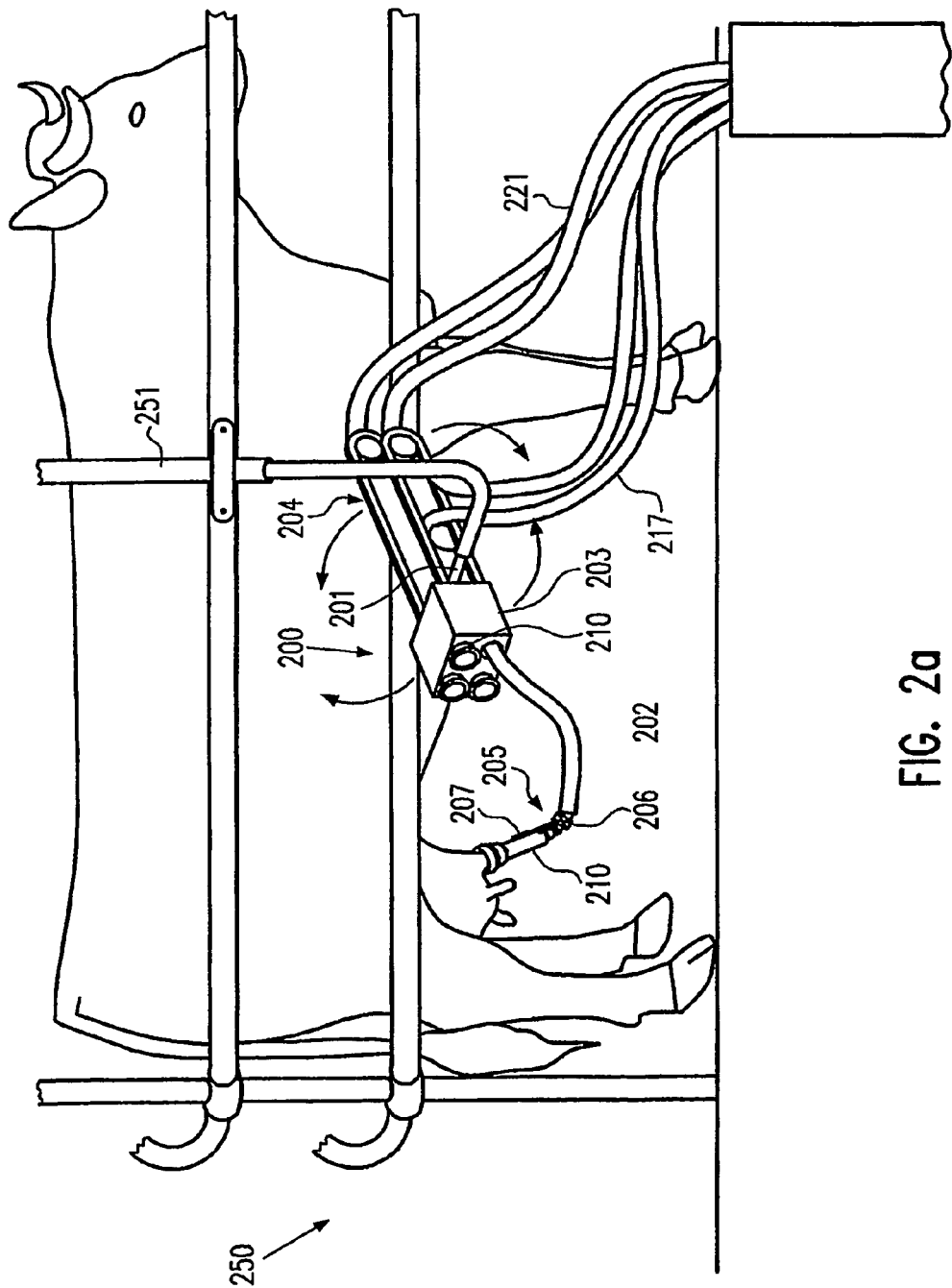

FIG. 2a schematically shows a perspective view of a milking parlour 250 with a support 251 that is formed so as to hold and/or guide milk lines 217 and control lines 221. For this purpose, the support 251 can also have corresponding devices in the form of cables, mounting screws and the like, so that the milk line 217 and the control lines 221 can be appropriately mounted. For example, the support 251 can be formed in such a way as is also described with reference to FIG. 1b. A retaining device 200 is mounted to the support 251, wherein in preferred embodiments, the retaining device 200 can be moved back and forth at least between two positions. For this purpose, the retaining device 200 has a fastening device 201, which, in the depicted embodiment, is formed for swivel-mounting of the retaining device 200 on the support 251. For example, the fastening device 201 can have a ball-head hinge that can be fixed in a number of positions, so that the retaining device 200 can easily be oriented in two or more positions. For example, a preferred operating position of the retaining device 200 can be such that teat cups 210 are arranged essentially horizontally with reference to their longitudinal axis when they are held by the retaining device 200 in a fixed position relative to one another during a first operational phase. In this connection, it is pointed out that the term "first operational phase" should be understood as a phase that occurs, for example, immediately before a milking process, wherein all teat cups 210 are held by the retaining device 200, before one or more thereof are moved by means of the manual action of an operator relative to the retaining device 200. Although the virtually horizontal orientation of the teat cups 210 in the retaining device 200 can be advantageous with respect to dirtying resulting from whirling particles of dirt, which can scarcely penetrate into the interior of the teat cups 210 in the case of a virtually horizontal arrangement, in other embodiments, it can certainly be possible to orient the retaining device 200 so that any desired tilting of the teat cups 210 can be achieved during the first operational phase. The retaining device 200 is furthermore arranged in such a way that it is possible to access the teat cups 210 manually during the first operational phase so that these are movable in several directions relative to the retaining device 200 and relative to at least one further teat cup 210. The phase during which all teat cups 210 are removed from the retaining device 200 will be referred to as the second operational phase in the following.

Furthermore, in the shown embodiment, the retaining device 200 has a container 203, which is formed in such a way as to hold the teat cups 210 at least partially, wherein manual access to the individual teat cups 210 is nevertheless possible. The container 203, which can, for example, be manufactured from plastic, offers increased protection against dirt and mechanical actions in comparison to "open" designs, in which the teat cups 210 can, for example, be exposed to a relatively large degree. The container 203 can, for example, also be manufactured in areas or completely of transparent plastic material, so that the status of the teat cups 210 can also be inspected at any time during the first operational phase.

Furthermore, in advantageous embodiments, a guide device 204 is provided that serves to guide the milk hoses 202 when the teat cups 210 are to be transferred from the first operational phase into the second operational phase. For this purpose, the guide device 204 can have corresponding devices in the form of cylinders, guide rails, rolls and the like, so that the teat cups 210, after being removed from the holder 200, can be removed relative thereto, wherein the operating range depends on the formation of the guide device 204. Further embodiments of the guide device 204 are explained in more detail with reference to FIG. 2b to 2d. Furthermore, in the shown embodiment, a vacuum switching mechanism 205 is provided, which makes it possible to switch the operating vacuum in the teat cup 210 on and off individually, and where applicable, in certain sections of the milk line 202. In the shown embodiment, a controllable valve element 206, for example, is provided that can be controlled by means of an operating control 207. The valve element 206 can be a pneumatically-operated or electrically-operated valve, wherein the operating control 207 then has a corresponding formation in order to activate the valve element 206 as needed. The vacuum switching mechanism 205 can be completely or partially provided on the holder 200, as will also be explained in more detail with reference to FIG. 2e to 2d.

During the intended use of the milking parlour 250, a desired height for the retaining device 200 can be adjusted, for example, with the help of the support 251. Furthermore, a desired orientation of the retaining device 200 can be selected by means of the fastening device 201, wherein said orientation allows an efficient milking process. For example, the retaining device 200 can be oriented in such a way, as shown in FIG. 2a, that the longitudinal axes of the teat cups 210 are aligned essentially horizontally. The corresponding adjustment work can be performed by an operator in a simple manner, because the weight of the retaining device 200 including the teat cups 210 is held by the support 251. After the adjustment of the desired orientation of the retaining device 200, in which the teat cups 210 are fixed in place relative to one another by a holder in the first operational phase, an operator can manually attach each individual teat cup 210 to a teat, wherein the guide device 204 moves in such a way that the corresponding appropriate length of the milk hoses 202 is provided. During the removal of the teat cups 210 from the holder 200, the vacuum switching mechanism 205 can be activated in such a way that, for example, the operating vacuum is not available at the teat cup 210 until immediately before the attachment of the teat cup 210 to the teat, so that atmospheric air is suctioned in for only a very brief time. In other embodiments, the vacuum switching mechanism 205 can be formed in such a way that after the removal of a teat cup 210, the operating vacuum is automatically applied to the teat cup 210. For this purpose, a corresponding operating element can be provided in such a way that, for example, switching on the operating vacuum is activated after a certain length of milk hose 202 is pulled out. A corresponding development of the vacuum switching mechanism 205 in the form shown or in the automated form makes it possible to attach the teat cups 210 in a convenient manner with only one hand. Furthermore, as a result of the retaining device 200 according to the invention, the attachment of the teat cups 210, that together with the milk hoses 202 and the retaining device 200 form a teat cup cluster, which, for example, replaces the conventional teat cup cluster 100 shown in FIG. 1a, guarantees a considerable relief for the operator, because only the weight of the individual teat cup 210 must be handled. After the completion of the milking process, the teat cups 210 can be individually removed, wherein the milking vacuum can be individually switched off by means of the vacuum switching mechanism 205, so that the teat cups can be removed without a risk arising that the teat cups that have not yet been removed fall. As a result of the individual attachment and removal of the individual teat cups 210, not only is the work made considerably easier, the risk of dirtying or contamination of the teat cups 210 and the milk hoses 202 is also considerably reduced, because the risk that the teat cups 210 or the milk hoses 202 come into contact with the ground is minimized.

Figure 2B:
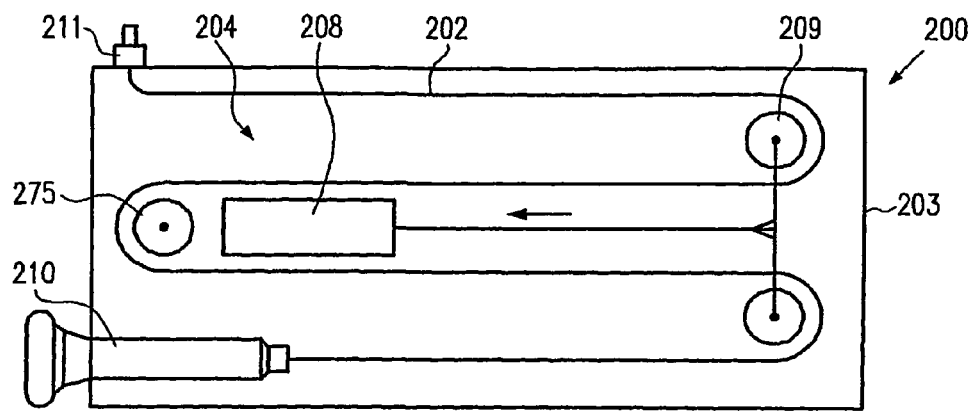

FIG. 2b schematically shows a portion of the retaining device 200 in a side view, wherein only one teat cup 210 is depicted. In this embodiment, the retaining device 200 can have the container 203 in a form that can completely hold the guide device 204, so that both the teat cups 210 and the guide device 204 are largely protected against environmental influences. In other embodiments, the container 203 can be formed in any other way, so that only parts of the guide device 204 and the teat cups 210 are shielded. The guide device 204 in this embodiment comprises coupled rolls 209 that can be moved together in the direction of the arrow, for example, by means of a cylinder 208 that is coupled to the rolls 209. A reversing element 275 is provided in order to guide the milk hose 202 with relatively little friction. As a result of the arrangement with a double reversing of the milk hose 202, a relatively large length of milk hose 202 can be achieved with a moderately small overall length of the retaining device 200. In other embodiments, a single roll 209 can be provided, in order to provide the necessary length of the milk hose 202. Furthermore, any other means can be provided in order to allow exact guiding of the roll or rolls 209. For example, a corresponding rail can be provided in place of the cylinder 208, and one axle of the roll 209 can slide in this rail in the direction of the arrow. Furthermore, the guide device 204 can have a locking means (not shown) that locks in place in one or more provided positions, in order consequently to prevent the milk hose 202 from being pulled out farther. For example, the position shown in FIG. 2b can represent a first position, in which the guide device 204 stops the milk hose 202, so that the retaining device 200 can be tilted or swiveled in any way, without it being possible for the teat cups 210 to slide out unintentionally. The lock can be deactivated immediately before the attachment of the teat cups 210 to the teat. In another embodiment, a stopping takes place after a certain length of the milk hose 202 has been led out of the holder 200, so that, for example, the guide device 204 can be formed in such a way that the removal of the teat cup 210 must be carried out against a certain initial tension in the guide device 204, which is then removed by means of the catch. After completion of the milking process, the catch can then be deactivated so that, by means of the initial tension on the guide device 204, the return of the teat cups 210 is supported.

Furthermore, the retaining device 200 has a multiple number of connectors that serve, for example, to hold the milk hoses and/or control lines. In this way, the milk lines 217 and control lines 221 can be decoupled from the retaining device 200 at any time, without any mechanical intervention in the retaining device 200 being necessary. For example, the milk lines 217 and the control line 221 can have corresponding connecting elements that tightly seal the corresponding lines when they are decoupled from the connectors 211. In this way, the retaining device 200 can be coupled to and decoupled from the milk lines 217 and control lines 221, without, for example, there being any influence on the operation of other teat cup clusters with corresponding retaining devices 200. Furthermore, in this way it is possible that the hose sections 202 can be separately cleaned in the retaining device 200 as needed, without it being necessary to clean the milk line 217 at the same time.

Figure 2C:
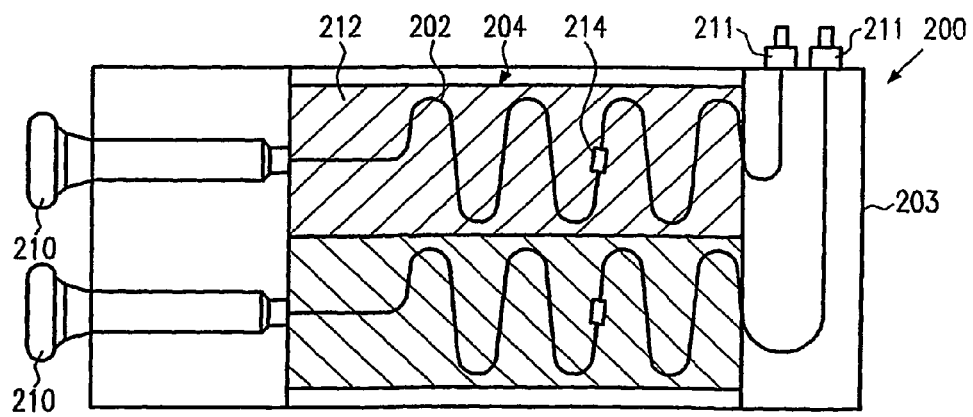
Figure 2D:
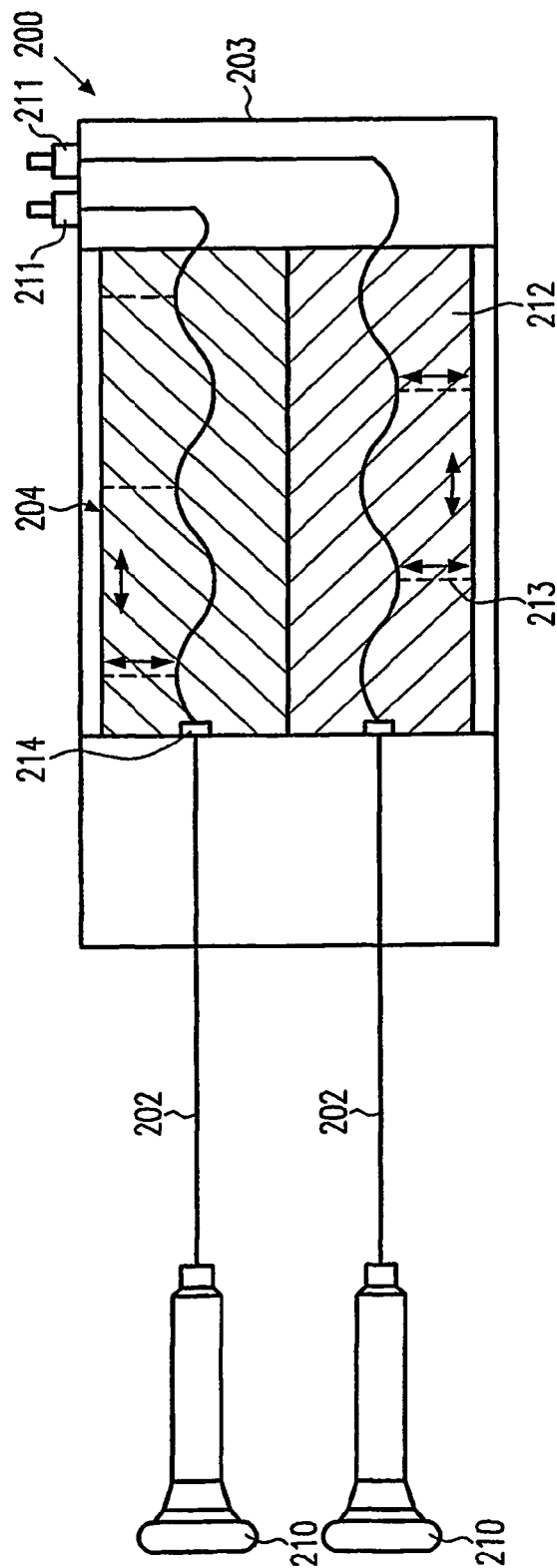

FIGS. 2c and 2d schematically show a side view of a further embodiment of the retaining device 200, wherein the guide device 204 is executed in a manner that is mechanically very simple, so that advantages result with respect to manufacturing costs, maintenance, wear and the like. In FIG. 2c, the retaining device 200 is shown in the first operational phase, i.e., the teat cups 210 are held in a position fixed to one another. The guide device 204 can, at the same time, having a chamber 212 for holding the accompanying hose section 202, which is arranged therein with a corresponding number of narrow windings, as shown in the figure.

FIG. 2d shows the retaining device 200 during the second operational phase, wherein the teat cups 210 and therefore the hose sections 202 are partially led out of the retaining device. Preferably, a stopping element 214 is provided, so that the length of the hose section 202 that is led out is limited in such a way that a snake-like arrangement of the hose section 202 is maintained in the chamber 212. In this way, it is ensured that when the teat cups 210 are returned to the holder 200, the starting position is roughly reached, as shown in FIG. 2c. Furthermore, elastic elements 213, for example, in the form of straps, can be provided, that are attached to the hose sections 202 and that can slide back and forth in the chamber 212, so that, by means of these elastic elements 213, a certain restorative force is exercised on the hose sections 202 in the second operational phase, in order thereby to support the return into the retaining device 200.

In other embodiments (not shown), the retaining device 200 can have other devices in the guide mechanism 204 that allow the hose sections 202 to be pulled out in a suitable manner. For example, a hose drum can be provided for each hose section 202, wherein said hose drum has a corresponding locking mechanism, as needed, and the return of the hose section 202 can be supported, as needed, by corresponding initial tension.

FIG. 2e shows the retaining device 200 with the guide device 204 in which the tracking movement of the hose sections 202 essentially takes place in the vertical direction. For this purpose, corresponding rolls 209 can be provided that are movable to some extent along a guide 209a. Furthermore, the fastening device 201 can be formed in one embodiment in such a way that the container 203 with the teat cups 210 can pivot, so that only a little force is needed to bring the teat cups 210 into a desired position. Advantageously, the container 203 can be brought into a milking position by means of the fastening device 201, in which position the teat cups 210 are arranged with their longitudinal axes virtually horizontal or with the openings pointing slightly downwards. If required, there can then be a pivoting into a cleaning position, in which the teat cups 210 are accessible for an external cleaning mechanism.

Further embodiments of the vacuum switching mechanism 205 will now be described with reference to FIGS. 2f and 2g.

Figure 2F:
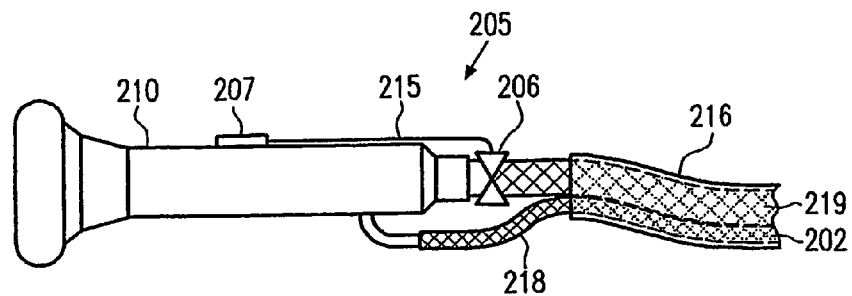

FIG. 2f schematically shows the teat cup 210 with the vacuum switching mechanism 205, as it is also schematically shown in FIG. 2a. The controllable valve 206 here is executed as a pneumatic valve, wherein the corresponding operating control 207 is, by means of a control line 215, connected to the valve 206 and to a corresponding compressed air or vacuum source. Furthermore, in the shown embodiment, the hose section 202, which here should represent a pulsator line 218, a milk line 219 and the control line 215, is surrounded by a casing 216, so that increased protection and simplified handling are achieved with the corresponding lines. The casing 216 can, for example, be produced in an integral manner with the corresponding lines 219, 218 and 215, so that relatively low manufacturing costs can be reached in this way. In other embodiments, the corresponding lines 218, 219 and 215 can be combined and led together by other suitable means, such as straps, sleeves, etc. As already mentioned, in other embodiments, the vacuum switching mechanism 205 can be electrically operated, so that the control line 215 can represent an electric supply and switching line.

Figure 2G:
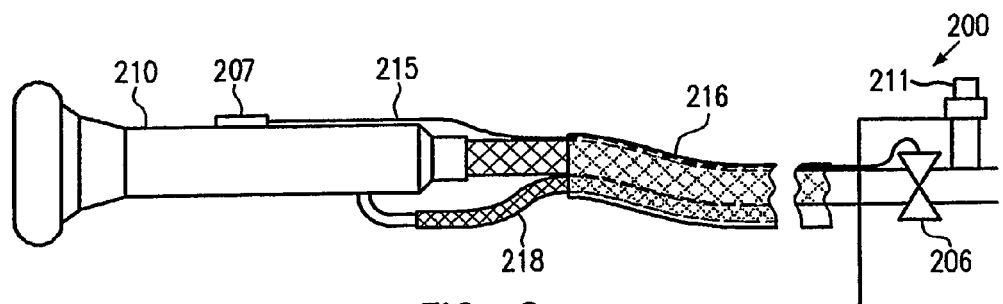

FIG. 2g shows a further variant, in which the valve 206 is provided in the retaining device 200, for example, near the connector 211 or at the connector 211, so that the valve 206 has a permanently fixed position within the retaining device 200.

In other embodiments, the valve element 206 can be provided in the form of a mechanically-operated device, for example, by means of a mechanically-operated valve, by means of a clip with which an intended area of the milk hose section 202 is squeezed, or the like. For example, a sliding valve can be provided on the connector 211, so that the operator can switch the operating vacuum on or off at the teat cup 210, as needed.

Figure 2H:
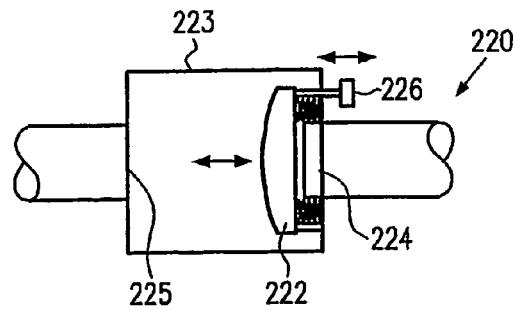

FIG. 2h shows a further advantageous embodiment, wherein a turn-off device 220 is provided in combination with the retaining device 200. The turn-off device 220 is formed in such a way that when there is a sudden drop in the operating vacuum in the teat cup 210, the milk line 217 (see FIG. 2a) to the teat cup 210 is closed in an air-tight manner. In one embodiment, a chamber 223 can be provided in the turn-off device 220 at the same time, in which chamber a pre-tensed sealing surface 222 is placed at a distance from an outlet 224 of the milk line when there is milking vacuum in the chamber 223, so that milk flow through the chamber 223 is possible. When atmospheric pressure enters from the inlet side 225, which, for example, can occur when a teat cup falls off of a teat, the sealing surface 222 is then pressed against the outlet opening 224. Furthermore, an operating element 226 is provided that is coupled to the sealing surface 222 and by means of which the outlet 244, when closed, can be opened, so that the air in the chamber 223 and in the milk line at the inlet 225 can be suctioned when a milking vacuum is desired in the teat cup. The turn-off device 220 can be provided additionally or alternatively to the vacuum switching mechanism 205. For example, the turn-off device 220 can be used as a means of switching the operating vacuum, wherein in the first operational phase, the teat cups 210 are acted upon with atmospheric pressure and consequently the outlet 224 is held closed via the sealing surface 222. With the removal of the teat cups 210 and with their attachment to the teat, the operator can correspondingly operate the operating element 226 so that finally a milking vacuum arises at the teat. In other embodiments, a corresponding turn-off device 220 can be provided in a milking claw (not shown) that can be mounted in the retaining device 200 at a suitable position, in order to hold the individual milk flows of the teat cups, so that when any teat cup falls off, at least a shared milk line is closed with a gas-tight seal.

FIG. 3a schematically shows a perspective view of a further embodiment of a retaining device 300 according to the invention under consideration, wherein said retaining device 300 is similar to the device 200, with an additional stimulation mechanism 340 being provided. The stimulation mechanism 340 can be formed in such a way that a drive element (not shown) is coupled to an actuator element 341 in such a way that this can act mechanically on the milk hose sections 302 in order in this way to exercise the desired stimulating pulses on a teat. In the embodiment shown, the actuator element 341 is present in the form of a bracket which is in contact with at least some of the hose sections 302, so that, by means of a straight-lined and/or rotational movement of the actuator element 341, a stimulating movement of the teat cups 310 on the teat is achieved. In this process, the drive element that is not shown can be pneumatically or electrically operated, wherein preferably the frequency and intensity of the mechanical effect can be controlled. For example, a control device can be provided that, depending on the conditions existing at that time, i.e., the length of the hose sections 302, type of udder of the animal, and the like, determines a frequency and amplitude suitable for efficient stimulation. For this purpose, for example, the drive power of the drive element necessary for the desired amplitude can be determined depending on the stimulation frequency, so that the stimulation frequency can be defined by the controller in a range that lies in a range favourable for the conditions existing at that time. For example, in this way, one of the natural resonances of the system built of the retaining device 300, the stimulation device 340, the hose sections 302, the teat cups 310 and the teat of the animal can be determined and an appropriate activation frequency can be selected. It is also advantageous to select a distance 343 between the area of the actuator element 341 that comes into contact with the hose section 302 and the housing 303 in such a way that the remaining length of the hose section 302, including the teat cup 310, is less than a height 342, so that in the event that a teat cup 310 falls off, it does not come into contact with the ground. For this purpose, the actuator element 341 can be formed in such a way that its orientation and/or length can be adjusted.

Figure 3B:
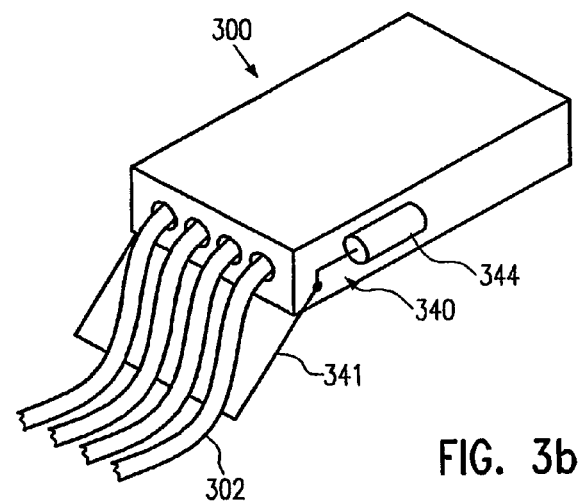

FIG. 3b schematically shows the retaining device 300 with the stimulation mechanism 340, wherein in this embodiment, the hose sections 302 are arranged in a row, so that the actuator element 341 that is activated by a drive element 344 essentially mechanically activates each hose section 302 in the same manner. In this way, it is possible to achieve a similarly stimulating effect on each of the teats, wherein only one drive element and one common actuator element are necessary.

Figure 3C:
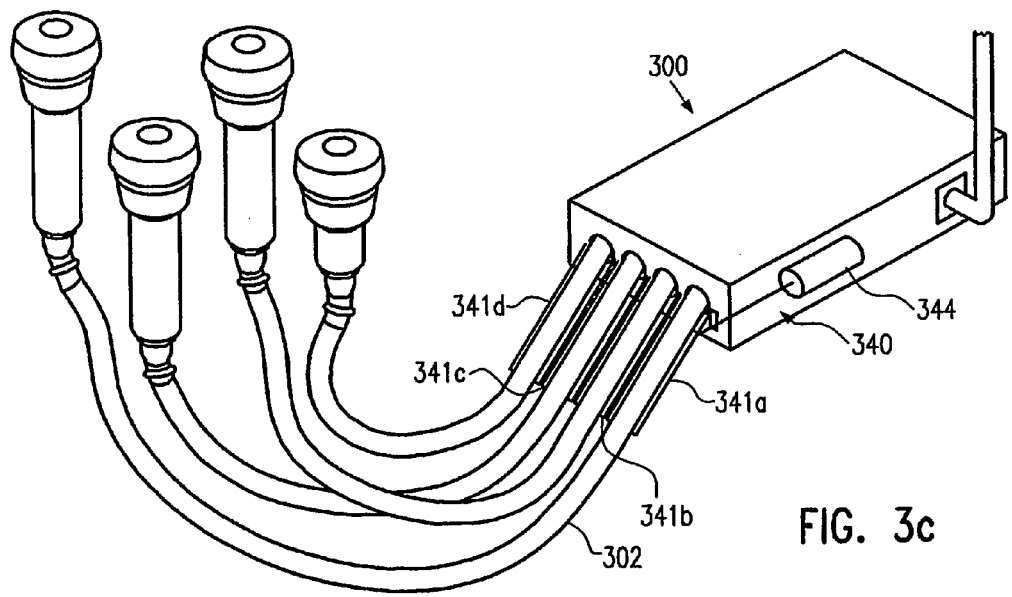

FIG. 3c schematically shows a further embodiment in which the retaining device 300 has a stimulation mechanism 340 that is formed in such a way that each hose section 302 can be individually mechanically operated. For this purpose, the stimulation mechanism 340 has corresponding actuator elements 341a, . . . 341d, that are coupled to corresponding drive elements 344a, . . . 344d. As a result of this action, reliable stimulation of each and every teat is guaranteed, regardless of the exact track taken by the hose section 302 from the retaining device 300 to the teat. In principle, it is also possible to stimulate the teats in an individually different manner in this way.

In place of or in addition to the stimulation mechanisms 340, one or more additional mechanical devices can be provided that are used for guiding the hose sections 302, in order, for example, to make possible improved return of the hose sections 302 and/or optionally to prevent the teat cups from coming into contact with the ground.

Figure 3D:
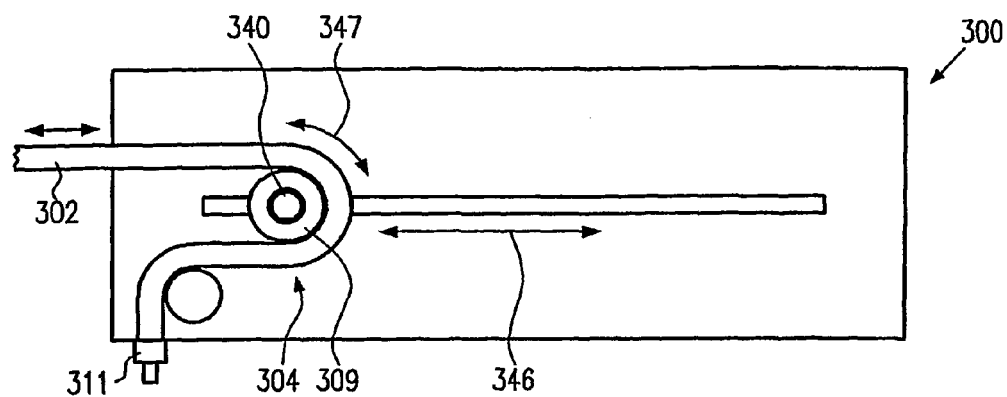

FIG. 3d schematically shows a further embodiment of the retaining device 300, in which a guide device 304 is formed in such a way that it also contains a stimulation mechanism 340. In the embodiment shown, a roll 309 is provided by means of which the hose section 302 is deflected, wherein the roll 309 can be slid in the direction shown by the arrow 346, in order to transfer a corresponding teat cup from the first operational phase to the second operational phase. The roll 309 is furthermore coupled to a drive element 340, for example, an electrically or pneumatically operated drive motor that can effect a corresponding rotational movement 347 of the roll 309. By means of this back and forth rotational movement, a corresponding mechanical action results on the hose section 302 and therefore a corresponding stimulation effect. A corresponding drive element 340 is provided for each of the hose sections 302, wherein, as already mentioned, a joint activation or individual activation can be carried out for each hose section 302.

Figure 3E:
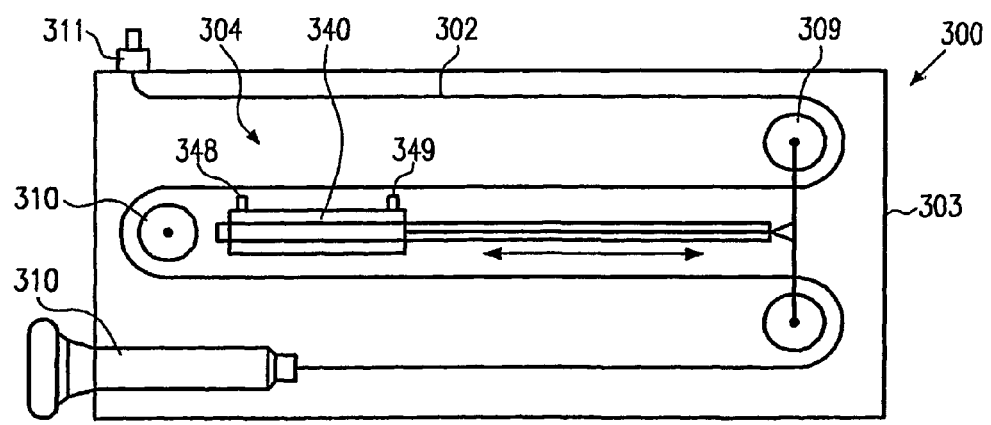

FIG. 3e schematically shows a further embodiment of the retaining device 300, wherein the stimulation mechanism 340 forms a portion of the guide device 304. For this purpose, a cylinder, for example, is formed as a drive element 340, wherein, for example, corresponding control inlets 348 and 349 can be provided on the cylinder, in order optionally to effect a movement of the rolls 309 in the horizontal direction and, where needed, to achieve a back and forth motion in the desired end position of the rolls 309, which then serves as a corresponding mechanical action for stimulating the teats. The cylinder 340 can, for example, be driven pneumatically with the help of the inlets 348 and 349 in such a way that the desired back and forth motion is achieved or also the back and forth motion is achieved with the removal of the teat cup 310 or with the return of the teat cup 310.

By providing a corresponding stimulation mechanism on the retaining device in the previously depicted embodiments, there can be an essential decoupling of the stimulation from the operating method during the milking process, i.e., from the manner of the activation of the teat cups with a suction phase and a release phase. In conventional teat cup clusters, one way of achieving a corresponding mechanical stimulation is by oscillating the teat cup cluster by means of the out-of-phase activations of two teat cup pairs each and by the milking claw's own weight. According to the invention, however, a desired mechanical movement is achieved at the udder by means of the stimulation mechanism, independently of the activation of the teat cup, so that a higher degree of flexibility is achieved in carrying out the milking process. In particular, all teats can be acted upon individually, in principle, with a suction phase and a release phase, without this impairing the mechanical stimulation.

Naturally the stimulation mechanism 340 can be formed in such a way as to achieve a desired tilted position of the teats by pulling on the hose sections 302, which can be advantageous during the post-milking. For this purpose, the controller of the stimulation mechanism 340 can drive to the appropriate position upon the command of an operator or by a sensor signal, i.e., the hose sections 302 return somewhat back into the holder 300, so that the desired teat position is achieved. Furthermore, a rhythmic movement can be carried out by means of periodic pulling and loosening in a desired centre position. For embodiments such as are described with reference to FIGS. 3a, 3b and 3c, a clamping mechanism (not shown) can be provided, in order to clamp the hose sections 302 tightly to the actuator elements 341. For example, this can be achieved with one or more brackets that are mounted on the actuator element 341 or on the container of the retaining device 300 in a way such that they can move, so that these brackets can be brought into an appropriate position for clamping the hose sections during the post-milking.

Figure 4A:
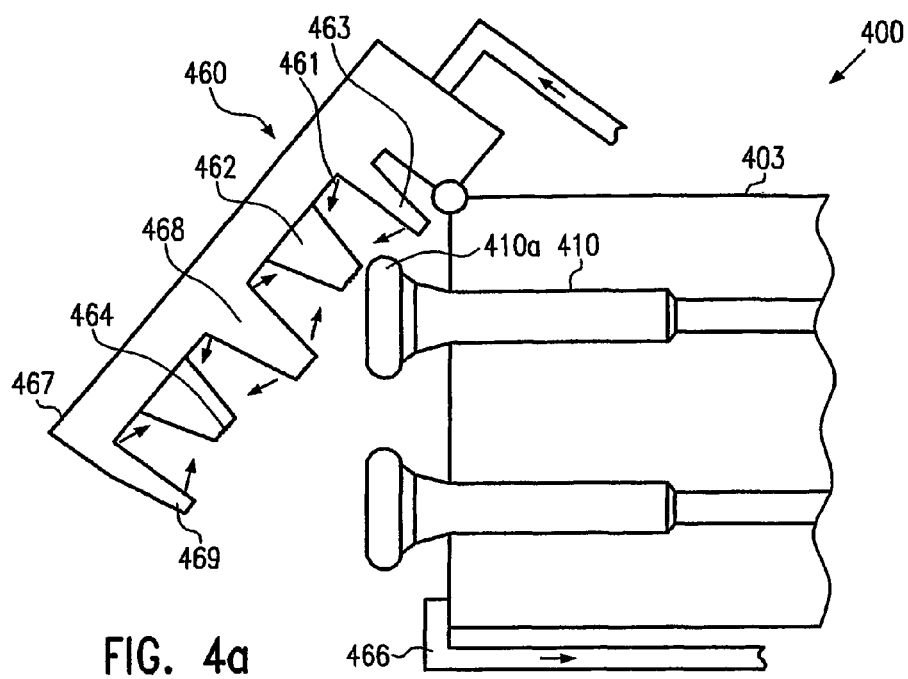
FIG. 4c shows the retaining device schematically in a milking position and in a cleaning position, wherein residual fluid can run out of the teat cups in the cleaning position and connection to external cleaning devices is possible.
FIG. 4d and 4e show the retaining device schematically in a position for intermediate disinfection.
FIG. 4f shows the retaining device, wherein the orientation of the teat cups is fixed.
FIGS. 4g to 4i shows variants for various hose cross-sectional profiles, so that twisting of the hose sections in the retaining device is reduced.
Figure 4B:
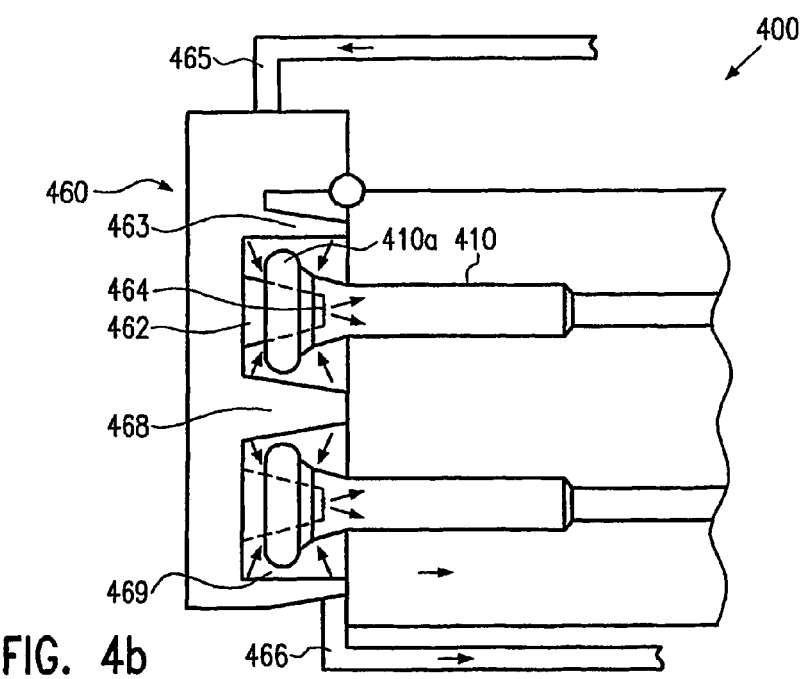

With reference to FIGS. 4a and 4b, a further embodiment of a retaining device 400 is described, in which a cleaning device 460 is provided in order to improve the hygiene conditions in an efficient manner before, during and after a number of milking processes.

In FIG. 4a, the cleaning device 460 is formed in such a way that this can be moved from a position in which an unobstructed removal of teat cups 410 is possible into a position in which the teat cups 410 are located in the second operational phase. For example, the cleaning device 460 can be mounted to a housing 403 of the retaining device 400 in such a way that it can rotate. The cleaning device 460 comprises a housing 467 with a cut-out in which sealing elements 462 are formed, wherein the sealing elements 462 are arranged in cut-outs that are formed by corresponding elements 468 or edges of the housing 467. Furthermore, the cut-out is bordered by sealing surfaces 463 that touch the housing 403 of the retaining device 400 when the cleaning device 460 is in the operating position. Furthermore, nozzle elements 461 are provided in order to spray out an appropriate cleaning fluid, that is, for example, fed via an inflow 465. Furthermore, corresponding nozzles 464 can be provided at the tips of the sealing elements 462. The nozzle elements 461 and the nozzles 464 are connected to the inflow 465 by means of corresponding canals (not shown), that can be formed in the housing 467 or by means of other connections.

FIG. 4b shows the retaining device 400 when the cleaning device 460 is located in the operating position. In this case, hollow spaces 469 are formed by the elements 468 and the corresponding seals 463, wherein said hollow spaces 469 hold a head area 410a of the teat cups 410. With the activation of the cleaning device 460, a cleaning fluid, for example water, can be fed in, wherein internal canals (not shown) feed the pressurized cleaning fluid to the nozzles 461, where the cleaning fluid is then ejected in the direction of the head areas 410a. By means of this rinsing process, any dirt can be rinsed off and then transported away via the discharge line 466. During the rinsing process, the sealing elements 462 are introduced into the head area 410a of the corresponding teat cups, so that penetration of the rinsing fluid into the interior of the teat cup 410 is prevented. In this way, external cleaning of the head areas 410a can be carried out in a quick and reliable manner, without a long-term interruption of the milking process being necessary. For example, after the completion of the milking process for one animal, the short period of time during which another animal enters the milking parlour can be used to clean the head areas 410a. As a result of this measure, it is also possible to minimize the transmission of any illnesses from one animal to another, for example, by means of adding appropriate agents to the cleaning fluid.

In a further embodiment, the cleaning device 460 can be formed in such a way that, where necessary, cleaning fluid can also be directed to the nozzles 464 at the tip of the sealing elements 462, so that even cleaning of the interior of the teat cups 410 and the bordering hose sections 402 is possible. This can be advantageous, for example, if an efficient intermediate disinfection of the teat cups or a final cleaning of the retaining device 400 is desired.

At the top, FIG. 4c schematically shows the container 403 of the retaining device 400 in the milking position during the first operational phase, wherein the teat cups 410 are arranged essentially horizontally. At the bottom of FIG. 4c, the retaining device 400 is located in the cleaning position wherein, here, an external cleaning device 470 is connected to the teat cups 410. In this way, where needed, a cleaning fluid 471 can be rinsed through the teat cups 410 and, optionally, the corresponding hose sections.

Figure 4D:
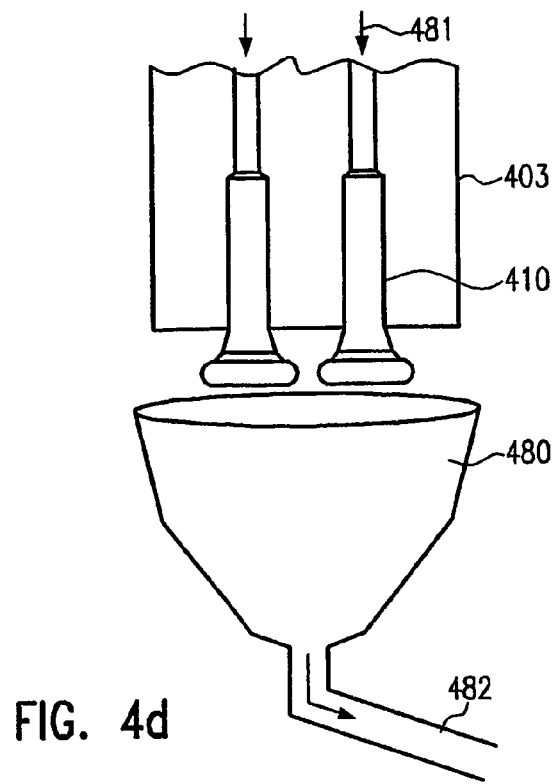

FIG. 4d schematically shows the retaining device 400 in a position for the intermediate disinfection of the teat cups 410. For this purpose, in one embodiment a container 480 can be provided that is suitably dimensioned for holding the residual milk and disinfectant 481 that flows out of the teat cups and that can then be taken away via a corresponding line 482. In this way, it is possible to prevent fluid that contains the disinfectant 481 from coming into contact with other biological waste. For example, in this way contamination of the liquid manure with foreign chemical substances can be prevented as far as possible.

In an advantageous embodiment, a disinfection device 483 is provided, for example, mounted on the container 480, wherein said disinfection device 483 is formed particularly for acting upon the outer area of the teat cup liners with the disinfectant 481. For this purpose, spraying nozzles or another suitable means can be used. Advantageously, the teat cups 410 protrude so deeply into the container 480 during the disinfection of the outer areas that virtually no disinfectant ends up outside, so that here again, no contamination of the milking parlour and its surroundings with disinfectant takes place. The "immersion" of the teat cups 410 can be accomplished by the operator, for example, by lowering the retaining device by means of the fastening device, or by raising the teat cups 410 independently of the retaining device 400 or the container 480 by means of a suitable lifting device. As soon as the teat cups 410 are then positioned suitably to the container 480, first a disinfection of the outer areas by means of the device 483 can take place, and then a disinfection of the interior of the teat cup liners, wherein the disinfectant 481 is introduced via the hose sections 402 via corresponding valve elements (not shown) and then caught in the container 480 and removed via the line 482 in a controlled manner. Furthermore, additional fluids, such as water and air, are added in order to rinse and dry the disinfected areas.

Figure 4E:
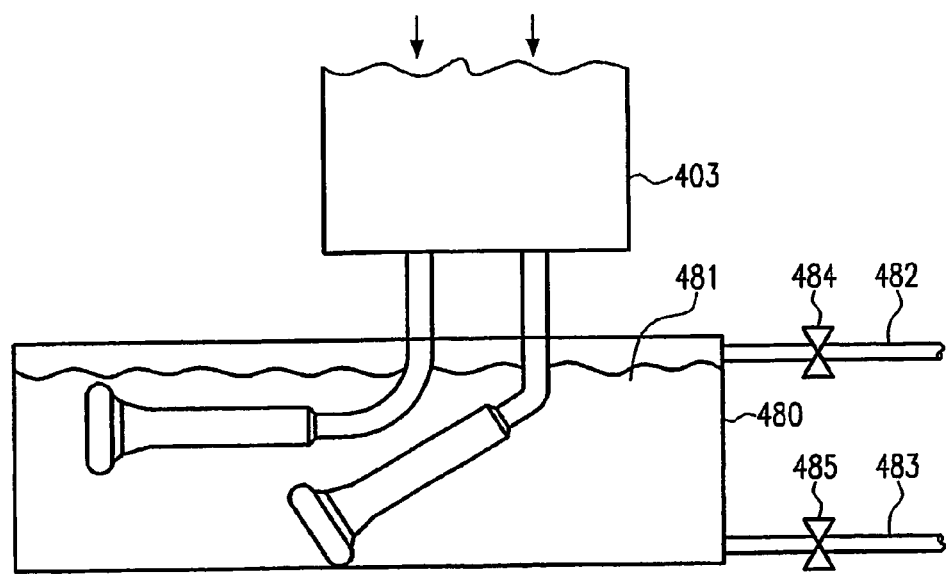

FIG. 4e shows a further embodiment in which the retaining device 400 is located in the intermediate disinfection position, wherein the teat cups 410 are partially "driven out" in order to immerse into the container 480, which can be filled with a suitable agent, such as the disinfectant 481. Furthermore, lines 482 and 483 can be provided with assigned valves 484 and 485, so that fluids, such as water or disinfectant can be fed to the container 480 and taken away from it in a controlled manner. Consequently, the entire intermediate disinfection process can take place in the container 480 in a controlled manner.

Alternatively, 2 or more containers 480 can be provided with different contents, wherein the retaining device 400 can then be correspondingly further pivoted, so that the disinfection process can be carried out. In this case, as well, there is essentially no contamination of the milking parlour surroundings with chemicals, wherein, because of the pivoting or movable retaining device 400, the disinfection procedures can be performed without a large expenditure of energy on the part of the operator. For example, the retaining device can be brought into position and the teat cups 410 can then be lowered by activation of the milk hoses, if these are directly connected to the teat cups, or by an operating mechanism (not shown) that allows access to the guide devices, such as are described with reference to FIGS. 2b to 2e, or by means of gravity, into the container 480 and, after a desired length of time, which is optionally determined by a timer of the retaining device, the teat cups are returned to the retaining device individually or together by means of operator intervention with the guide device.

Figure 4F:
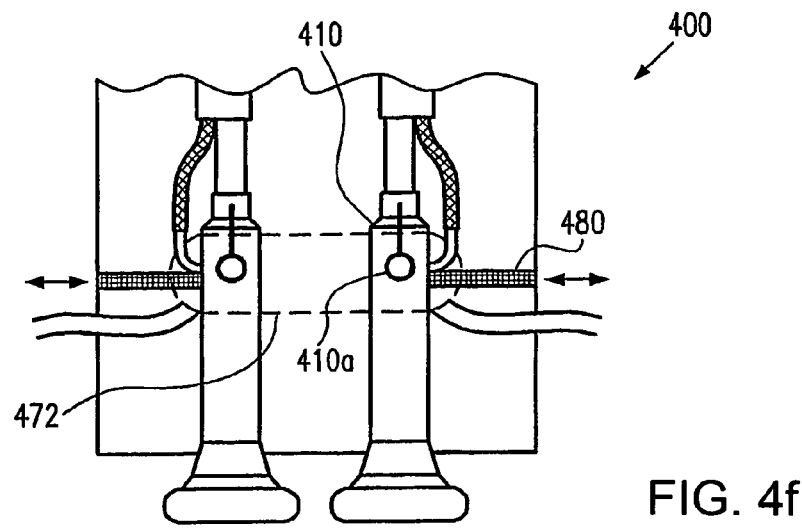

FIG. 4f schematically shows the retaining device 400, wherein the container 403 is located in the cleaning position. Furthermore, in this embodiment, the teat cups 410 are provided with valve elements 410a, which allow the entry of atmospheric air during the folding of the teat cup liner in the release phase. The valve elements 410a are extremely advantageous, because during the milking process, a return acceleration of the milk column to the teat is effectively reduced. In order to ensure an efficient rinsing of these valves 410a, a fixative device 480 is provided, which can, upon the return of the teat cups 410 to the container 403, which can have corresponding areas (not shown) for this, guarantee a desired orientation of each teat cup 410 in the container. Furthermore, a corresponding opening, cut-out or similar means is provided on the container wall of the container 403, so that the valves 410a, which are correctly oriented due to the fixative device 480, can be connected to a corresponding external cleaning device 472. Advantageously, the devices 470 (FIG. 4c) and the device 473 can be operated in combination.

Figure 4G:
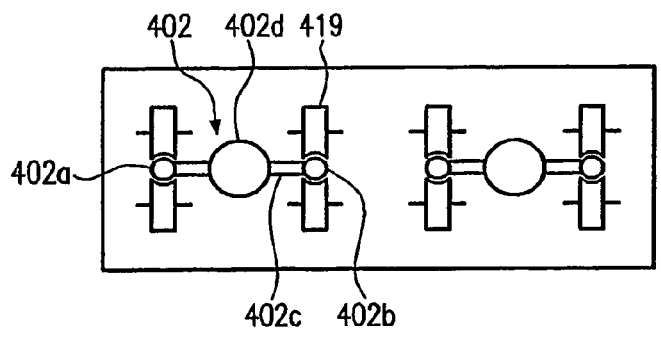

FIG. 4g schematically shows embodiments for the hose sections 402 that have at least one area with a characteristic cross-sectional profile, so that guiding of the hose sections 402 is made possible by the profile, in order essentially to avoid twisting of the hose sections when torsional forces arise. In one embodiment, such a profile is obtained by means of connecting at least one control hose 402a to the milk-conducting area 402d. For this purpose, a connection area 402c can be provided, which, while offering a flexible connection, still provides sufficient rigidity for preventing twisting. For example, the elements 402d, 402a and 402c can be produced by means of injection moulding. Furthermore, additional lines 402b can be integrated, the line 402a can represent a pulsator hose and the line 402b can represent a stimulation line or a compressed air control line or an electric line.

To guide the hose section, a device, for example, in the form of rolls 419, can be provided, so that smooth-running guiding with simultaneous high stability against twisting is ensured.

Figure 4H:
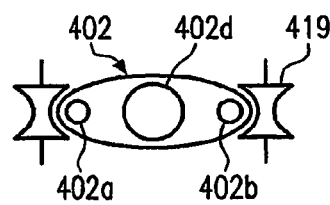

In FIG. 4h, a further example of a suitably profiled hose section 402 is shown, which, for example, can have two additional lines 402a, 402b in addition to the milk-conducting part 402d, wherein, for example, lateral rolls 419 provide the guidance.

Figure 4I:
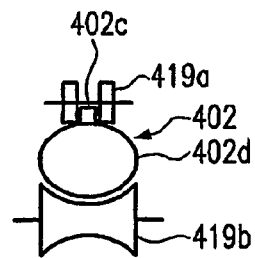

In FIG. 4i, a further variant is depicted, wherein the profile shape by means of a strip 402c is suitable for use as a guide against twisting.

Naturally other profile shapes can be used for hose arrangements, wherein several lines are advantageously combined in an integral form, wherein said hose arrangements offer sufficient flexibility with a high degree of deformation rigidity.

FIG. 5 schematically shows a further embodiment of a retaining device 500, in which devices are provided in order to control and/or regulate and/or monitor the milking process. For this purpose, a control device 570 is provided that, in one embodiment, has one or more sensor elements 571 that are arranged at a suitable position within the milk flow, or that are arranged in such a way as to register at least one characteristic identifier of the removed milk. For example, the sensor element 571 can represent a flow rate sensor that is arranged at a suitable position in the hose section 502, for example, close to a connector 511, to which a corresponding milk line to a collection container can be connected. The sensor element 571 is connected to a control unit 574 that can, for example, be formed so as to evaluate signals of the sensor element 571 and process them in a suitable manner. For example, the control unit can be connected to a display 573 and/or to a corresponding actuating element 572, in order to exercise an appropriate reaction in reaction to the sensor signals. For example, the actuating element 572 can be provided in the form of a controllable valve. The control device 570 can furthermore have a power supply 575, which can be connected to an external voltage supply, or which, where necessary, can generate suitable voltages by means of an appropriately formed generator. For example, the voltage supply 575 can have a pneumatically-operated generator. The voltage supply 575 can also be formed to supply further electrically operated elements, for example, electric valve elements in a vacuum switching mechanism, such as have already been described, for example, with reference to FIG. 2a.

During operation of the retaining device 500, the teat cups 510 are individually attached to the teat, as has also been described beforehand, and the milking process is started, wherein a quantity characteristic for the milking process, for example, the milk flow, the milk quality, i.e., for example, the number and size of pus floccules, salt content to the milk, etc., is registered and passed on to the control unit 574. By corresponding processing of the output signal of the sensor element 571, further actions can then be taken. For example, a corresponding measured value can be displayed on the display 573 or reported to the operator acoustically. Furthermore, it is possible to intervene in the milking process in a regulated manner, for example, by means of activating the actuating element 572 depending on the sensor signal of the sensor element 571. For example, when the milk flow falls below a certain quantity, the operator, can, by means of the display 573, be notified in order to end the milking process at the respective teat. Furthermore, the control unit 574 can be formed to control the milking process automatically on the basis of the sensor signals of the sensor element 571, according to a program sequence stored in the control unit. For example, when the milk flow quantity falls, the actuating element 572 can act on corresponding control lines so that, where applicable, the pulsator activation can be removed, in order to thereby end the milking process for the teat in question. Naturally, other or additional control tasks are possible, depending on the type of stored program sequences and the configuration of the control unit 574. In particular, input elements can also be provided, in order to enter animal-specific data that can be used for evaluation purposes. For example, corresponding interfaces or output units can be provided in order to provide parameters that identify the milking process in connection with the corresponding identity information. This can advantageously take place in a wireless manner, so that simple installation is possible.

In summary, it can be said that the invention under consideration improves semi-automatic milking in an efficient manner, by means of considerably simplifying the process of attaching the teat cups to the teats and wherein the possibility of considerably improving hygiene conditions during the milking is created. Furthermore, the retaining device of the invention under consideration can be provided in a very compact manner, wherein, according to the level of equipment, cleaning and control possibilities can be integrated, so that a high level of automation is achieved with a small personnel investment. In particular, it should be noted that the previously described embodiments can be combined in an appropriate manner, depending on the type of application and the level of automation that is needed.

FIG. 6a schematically shows a milking installation that comprises a vacuum device 630 that is formed to generate an operating vacuum needed for the milking. The vacuum device 630 is connected to a teat cup cluster 610 as far as the flow is concerned via at least partially flexible milk hoses 613, which are in turn connected to the teat cup cluster 610 through a milking claw 611. The milking claw 611 is connected to teat cups 612, which have suitably formed teat cup liners, via corresponding flexible milk hoses 615. Furthermore, a pulsator 620 is provided that is in a flow connection with the teat cups by means of an at least partially flexible line 614 via the milking claw 611 by means of corresponding flexible lines 616 in such a way that, where required, it is possible to fold the teat cup liners in the teat cups 612. The milking installation 600 furthermore comprises an actuator 650 with a holder 651 and a movable actuator element 652, wherein the actuator 650 is mounted at a position distanced from the teat cup cluster by means of the holder 651, for example on a holder 640 of a milking parlour. In the embodiment shown, a fastening device 653, which is connected to the actuator element 652, is shown schematically, wherein said fastening device 653 can be connected to a flexible component that is connected to the teat cup cluster 610. In the embodiment shown, the fastening device 653 is coupled to the flexible milk hoses 613. Advantageously, the fastening device 653 is formed in such a way that a sufficiently rigid connection to the milk hoses 613 or other flexible components is possible quickly and reliably, and likewise a decoupling of the fastening device 653 from the flexible component is possible. For this purpose, the fastening device 653 can have quick-release fasteners, rigid or flexible components and the like. The actuator element 652 is movable in at least one direction, in order to give the milk hose 613 a corresponding movement, which is then transferred to the teat cup cluster 610. For this purpose, the actuator element 652 is equipped with corresponding driving devices, that, for example, can comprise pneumatic driving devices, e.g., in the form of compressed air motors and/or electric driving devices, e.g., in the form of electric motors. A corresponding connector 654 for feeding a suitable energy form is provided, and said connector 654 can be formed, for example, in the form of a pneumatic hose, an electric line or the like. A few exemplified embodiments of the actuator 650 according to the invention are described in the following, with reference to FIG. 6c to 6e.

In some embodiments, the milking installation 600 comprises a control device 660, which is functionally connected to the actuator 650 and which can also be connected to other components of the milking installation 600, such as to the pulsator 620. The control device 660 can contain mechanical and/or electronic components that allow regulated movement of the actuator element 652. For example, a timer can be realised in the control device 660, wherein said timer directs a specified type of movement, for example, frequency and/or amplitude of the movement of the actuator element 652 for a specified length of time. In advantageous embodiments, the control device 660 comprises an electronic circuit in which specified program sequences can be implemented, and/or in which special control sequences can be selected or, on the basis of input signals, changed and/or initialized. For this purpose, the control device 660 can also have suitable control means, such as current-outputting and voltage-outputting components, electro-pneumatically operated components and the like. In some embodiments, the control device 660 can be integrated in the actuator 650 or in other components of the milking installation 600, or the control device 660 can be formed as a single device. At the same time, the activation of the actuator 650 and, where appropriate, other components, such as the pulsator 120, can take place via corresponding lines, for example, electric lines, pneumatic lines and the like. In other embodiments, the control device 160 and the actuator 650 can have corresponding components for wireless communication, so that corresponding control lines can be dropped. For example, the control device 660 can have at least one output level for sending data to the actuator 650, which, in turn, has at least one corresponding receiver in order to receive the data from the control device 660 and to start an appropriate movement of the actuator element 652 in reaction to the received data. In further embodiments, mutual exchange of data can take place between the control device 660 and the actuator 650.

During the operation of the milking installation 600, the teat cup cluster 610 is manually attached to the udder of the animal, wherein beforehand a corresponding manual cleaning of the teats has taken place. As mentioned at the beginning, when there are larger numbers of animals, it may be that sufficient manual pre-stimulation is not carried out properly, so that often automated pre-stimulation is carried out by means of the pulsator 620. This type of pre-stimulation, which includes a folding of the teat cup liners at high frequency can, however, lead to damage to the mucous membranes, as a result of which the acid barrier of the teat can be impaired. By means of the actuator 650, therefore, an appropriate movement can be transferred during a pre-stimulation phase by the movement of the actuator element 652 to the flexible component, in the example shown, the milk hose 613, and finally, via the teat cup cluster 610, to the teats and the udder of the animal. In this connection, advantageously the pulsator 620 can be adjusted in such a way that at the beginning no suctioning of the teat cistern milk takes place, and the "hammer-like" folding of the teat cup liner is reduced or avoided completely. Advantageously the activation of the actuator 650 and the pulsator 620 is coordinated by the control device 660 in such a way that, during the pre-stimulation phase, little or even no milk is removed, and stimulation of sufficient duration is performed on the udder, without the risk of mucous membrane damage arising. For this purpose, the control device 660 can, for example, have the pulsator 620 adjust the teat cup liner folding at a high frequency for a certain minimum length of time, for example, one minute, and leave the teat cup liner folded while the actuator 650 incites the necessary mechanical stimulating pulses. After completion of the pre-stimulation, the pulsator 620 can then start the actual milking process by means of selecting the desired operating mode for the milking process. In this connection, common-mode suctioning can also take place on the basis of the actuator 650 according to the invention, because a desired movement of the teat cup cluster 610 that relaxes and stimulates the smooth udder musculature can be incited by the actuator 650, and consequently the stimulating movement of the oscillation of the teat cup cluster 610, which is typically brought about by the pulsator 620, which is operated in two-frequency operation, is not necessary. At the same time, the control device 660 can be formed in such a way that two or more different types of movement can be called up, in order in this way to achieve a high degree of flexibility in the further stimulation during the milking process. In an advantageous embodiment, the control device 660 is formed as a wireless, mobile device with which one or more actuators 650 can be activated, so that corresponding different movement forms can be executed by the actuator elements 652. It is often common for multiple numbers of teat cup clusters 610 to be in use, wherein said teat cup clusters 610 are attached one after the other by a single person, so that different sequences arise for the milking process in individual animals, on the basis of the different times and animal-specific differences. In this case, the user can then address corresponding actuators 650 suitably by remote control, so that the stimulation for the diverse animals can be conveniently and individually adjusted, on the basis of the milker's experience, for example, by observation of the udder condition. For this purpose, the control device 660 can be arranged in a suitable manner so that, along with the transmission of appropriate control data to the multiple number of actuators 650, accompanying coding data can be sent, which is defined by the user, for example, at the press of a button, so that a certain actuator 650 can be selectively addressed. It is also possible for different radio frequencies to be used for different actuators 650. On the basis of the actuator 650 according to the invention, consequently, a stimulating movement of the teat cup cluster 610 on the udder is achieved additionally or alternatively, independently of the operating mode of the pulsator 620, so that an overall higher degree of removal of the milk can be achieved.

In some embodiments, a sensor device is provided, for example in the form of sensors 661, 662 and 663, which are disposed at an appropriate location, for example on the tail, or on one leg of the animal or in the milk flow. The milk flow sensor 663 is formed to register the sequence of the milk flow over time. In an advantageous embodiment, the sensor 663 is formed to register the milk flow virtually continuously, so that the relaxation rhythms of the animals can also be registered. At the same time, reference data for the milk flow curve of one or more animals can be stored in the control device, so that an appropriate activation of the actuator 650 can take place when there is a deviation between the current milk flow curve and the reference data.

The sensor 661 can be formed in such a way that it registers the tail position of the animal, which in turn can be judged as a sign of the animal's milkability during the pre-stimulation phase. For example, it is known that many animals, upon reaching a certain feeling of wellbeing which is necessary for the milkability, lift the tail, so that a corresponding change in the position of the tail and therefore of the sensor element 661 can be used as an index for the stimulation status of the animal. For this purpose, the sensor 661 can provide a signal, for example in the form of a gradient switch or a speed or acceleration or pressure sensor, based on its orientation, wherein said signal can be used by the control device 660 for the activation of the actuator 652 and/or the pulsator 620. For example, the pre-stimulation phase can be extended until such a time as the sensor 661 has signalled a corresponding milkability on the part of the animal. The sensor 662 can detect, for example, the kicking movements of the animal, so that, where appropriate, this signal can be used by the control device 660 as an indicator of the stimulation status of the animal. For example, it is known that frequent kicking movements during the milking indicate a declining milkability or a characteristic that disturbs the animal. With the occurrence of increased kicking frequency, which is signalled to the control device 660 by a sensor 662, consequently a corresponding activation of the actuator 652 can take place, so that, e.g., another stimulating movement is achieved and therefore increased milkability is regained. The sensors 661 and 662 can be formed in such a way that they are left on the animal for longer periods of time, so that no additional expenditure of labour arises during the milking. In particular, the sensors 661 and 662 can be formed in such a way that they communicate with the control device 660 wirelessly, wherein each sensor can have a unique ID, so that the control device 660 can recognize each of the sensors 661 and 662 if these are provided for a number of animals. In advantageous embodiments, appropriate electromagnetic converters are provided in the sensors 661 and 662, so that the kinetic energies of sensors 661 and 662 can be converted into corresponding electric energy, so that a high degree of autarchy is achieved with respect to the power supply of sensors 661 and 662. Naturally the sensors can additionally or alternatively have corresponding batteries or rechargeable batteries.

FIG. 6b schematically shows a portion of the milking installation 600 according to further embodiments, wherein the actuator 650 is coupled to an actuator element 652 with a pulling device 670, which makes it possible to achieve an angle of tilt α, which is shown in the drawing as 90°, by pulling on the flexible milk hoses 613. In order to achieve the largest possible adjustment range for the angle of tilt α, the actuator element 652 can have a driven roll, so that a strap of the pulling device 670 can be correspondingly wound or unwound, in order to achieve the desired orientation of the teat cup cluster 610. In addition to a broad adjustment range for the angle of tilt α, a corresponding stimulating movement can furthermore be achieved around this base position that corresponds to the desired angle of tilt. For this purpose, the actuator element 652, after reaching the desired base position of the angle of tilt, can be moved back and forth around this position, in order to achieve a corresponding stimulating effect, in the example shown, with a base position of 90° with reference to the base of the udder. Naturally, the embodiment shown in FIG. 6b can also have all components of the embodiment shown in FIG. 6a, so that, in particular, the angle of tilt α can be adjusted by way of initiation, for example, automatically by the control device 660 or by an operator. In one embodiment, a sensor element 663a is provided on the teat cup cluster 610 as a sensor device, wherein the sensor element 663a can be sensitive to movement and/or to the position. This means that the sensor element 663a can generate a signal depending on the angle of tilt α and/or can generate a signal depending on the actual movement of the teat cup cluster 610, which is then conveyed to the control device 660, which thereupon correspondingly activates the actuator 650. For example, on the basis of the signal 663a, the angle of tilt α can be determined during each phase of the milking process, so that the control device 660 then tracks the actuator 650 accordingly or adjusts a tilt desired for the particular milking phase. In a similar way, the movement actually incited by the actuator element 652 at the teat cup cluster 610 can optionally be determined by means of the sensor device 663a, so that a movement favourable for the stimulation can be achieved by a corresponding change to the activation of the actuator element 652. Consequently, for example, the type of movement of the teat cup cluster 610 brought about for a specified movement of the actuator element 652 depends on many factors, which can change from animal to animal and during the milking process. In this connection, it may be that oscillating movements brought about by the pulsator 620 can be calculated in a simple manner, where needed, by means of, for example, the movement of the teat cup cluster 610 being measured by the sensor element 663a when the actuator element 652 is not activated, and the control device 660 then taking this into consideration when the sensor signal is received with the activated actuator element 652.

In other embodiments, the control device 660 can be formed in such a way as to estimate the movement of the teat cup cluster 610 from the actual movement of the actuator element 652. For this purpose, the actuator element 652 can be connected to a corresponding electromagnetic converter (which will be explained in more detail in connection with FIG. 6c to 6e) or optic or inductive position encoders that generate electrical energy from the movement of the actuator element 652, wherein said energy is then a measure of the actual movement and serves as a basis for the estimation for the control device 660. For example, from a constant supply energy for the actuator element 652 and the actually resulting movement, the status of the mechanical system of the milk line 613, teat cup cluster 610 and the like can be evaluated, so that a form of movement of the actuator element 652 favourable for the stimulation can be selected. If, for example, at a constant input energy, a relatively small actual movement of the actuator element 652 results, it can be assumed that the currently selected form of movement of the actuator element 652 leads to only a very small stimulating movement at the udder. By changing the activation of the actuator element 652, a suitable form of movement can then be determined for the actuator element 652. This can also be done in a simple manner, by means of the operator observing the teat cup cluster 610 and noting whether or not the current activation of the actuator element 652 leads to an adequately stimulating movement. The operator can then advantageously, by remote-control, as was previously described, select a different type of movement, for example, by changing the frequency, intensity, direction, etc., so that a better stimulating effect is achieved.

In one embodiment, the sensor element 663a can be mounted on one or more of the teat cups 612 in such a way that the stimulation status of the teat is detected. For example, the sensor element 663a can have a pressure-sensitive area that is arranged in the vicinity of the teat cup liner edge, so that a corresponding pressure change in this area is detected when the teats become erect, wherein said pressure change is conveyed to the control device 660.

FIG. 6c schematically shows an example of an embodiment of the actuator 650, wherein the actuator has the actuator element 652 in the form of a drive with a roll, wherein the drive can be pneumatic and/or electromagnetic, wherein at least a rotational movement of the actuator element 652 is possible in the forwards and backwards direction. Furthermore, the actuator 650 comprises a guide roll 656, so that the flexible component, for example, the milk hose 613, can run between the guide roll 656 and the drive roll of the actuator element 652. In this connection, the guide roll 656 is advantageously formed in such a way that it can simply be sunk or moved away from the operating position so that the milk hose 613 can be threaded in a simple manner. During the operation of the actuator 650, the actuator element 652 is activated in such a way that a rotational movement occurs, which then moves the milk hose 613 back and forth, depending on the direction of movement of the actuator element 652. In particular, in this connection, the angle of tilt $\alpha$ (see FIG. 6b) can also be adjusted in a simple manner, by it first being moved to a desired base position and then the desired stimulating movement being effected by corresponding two-way activation of the actuator element 652. Furthermore, the actuator element 652 can have a further device (not shown), which gives the milk hose 613 a movement in a further direction, linearly independent of the first direction of movement. For example, the drive roll of the actuator element 652 or this element itself, as well as the guide roll 656, can be movable in a direction perpendicular to the drawing plane, so that as a result, an additional movement component is achieved for the milk hose 613.

FIG. 6d schematically shows a further embodiment of the actuator 650, wherein the actuator element 652 has a drive roll onto which a flexible component 671, for example, a strap, a rope, etc., can be wound or unwound. The flexible component 671 is connected, for example, to the milk hose 613, so that by winding or unwinding the flexible component 671, a corresponding movement is brought about on the milk hose 613, by means of which in turn the angle of tilt $\alpha$ and/or a desired stimulating movement of the teat cup cluster 610 on the udder is adjusted. Furthermore, the actuator element 652 can in turn be formed in such a way that a movement in at least a second, independent direction is possible, by means of, for example, the provision of a further actuator component or as a result of the actuator element 652 being movable in at least one further direction. Furthermore, in the embodiments of the actuator shown in FIGS. 6c and 6d, corresponding sensor devices for registering the actual movement of the actuator element 652 can be provided. For example, corresponding optical or inductive encoder elements can be provided in combination with the actuator elements 652 and/or the guide roll 656, wherein said encoders output a signal corresponding to the movement. On the basis of this signal, at least the deflection and/or frequency of the momentary movement of the actuator element 652 can be determined. In other embodiments, an electromagnetic converter can be provided, in which the mechanical movement of the actuator element 652 is converted into a corresponding electrical energy, which then can serve as a measure of the momentary movement of the actuator element. In some embodiments, particularly when the actuator element 652 comprises a pneumatically driven drive mechanism, the electrical energy can also be used in order to provide energy to one or more electronic components, for example, a device for wireless communication and/or a controller.

FIG. 6e shows a further embodiment of the actuator 650 having a first actuator element 652a and a second actuator element 652b, which can give a movement in at least two different directions to a coupled flexible component 613 by means of the fastening device 653. Advantageously, the actuator elements 652b and 652a can be activated independently of each other, in order to achieve a high degree of flexibility in the incitement of a desired stimulating movement. Naturally, further actuator elements can also be provided, in order to make it possible to form complex movement patterns. Furthermore, a sensor device 657 is provided for registering the actual movement of the actuator element 652a, wherein said sensor device 657 is depicted as an electromagnetic converter in the embodiment under consideration. In other embodiments, a corresponding device can also be provided for the actuator element 652b, so that individual registering of the individual movement components is possible. As was previously mentioned, the electromagnetic converter 657 can also be used for generating electrical energy, which can then serve for supplying one or more components of the actuator.

Naturally the previously depicted embodiments of the actuator 650 are only of such a nature as to be descriptive, and any components of known actuating elements, drive motors, pneumatic components, valve elements, etc., can be combined in order to achieve a desired movement of the actuator element 652, wherein said movement can be regulated. Furthermore, it should be noted that the embodiments described can be combined in any way.

The invention claimed is:

1. A retaining device for the manual removal of teat cups with
   a fastening device for fixing the retaining device at a predetermined milking position,
   the retaining device being formed to hold each of a multiple number of teat cups in a fixed position relative to the others during a first operational phase, and to allow manual access to each of the retained teat cups in such a way that, during a second operational phase, each teat cup is manually movable relative to the retaining device and at least one additional teat cup in more than one direction, wherein the retaining device furthermore has a stimulation mechanism that is formed to act mechanically on at least one milk hose that connects a teat cup to the retaining device during the second operational phase, for inciting a rhythmic movement to the teat cup while it is maintained in contact with and attached to a cow's teat.

2. The retaining device according to claim 1, wherein the retaining device has a container in which the teat cups are introduced at least partially during the first operational phase.

3. The retaining device according to claim 1, which furthermore comprises a guide device for guiding milk hoses during the movement of the teat cups relative to the retaining device.

4. The retaining device according to claim 1, which furthermore comprises a controllable vacuum switching mechanism that is formed to apply an operating vacuum to each of the teat cups in a controllable manner.

5. The retaining device according to claim 4, wherein the vacuum switching mechanism has a control switch for each of the teat cups.

6. The retaining device according to claim 4, wherein the vacuum switching mechanism has an operating mechanism that switches the operating vacuum depending on the distance of the teat cup from the retaining device.

7. The retaining device according to claim 4, wherein the vacuum switching mechanism comprises a turn-off device that is formed to decouple a teat cup from the operating vacuum individually and automatically in the case of a loss of the milking vacuum in that teat cup.

8. The retaining device according to claim 1, which furthermore has several connectors that make possible a connection to one or more milk hoses that connect the retaining device to a milking installation and to a vacuum line of the milking installation.

9. The retaining device according to claim 8, which furthermore has hose sections, wherein one end of each hose section is connected to a connector and wherein the other end of each hose section can be connected to a teat cup.

10. The retaining device according to claim 9, wherein each hose section has at least one control hose section, which can be connected on one end to a teat cup and on the other end to a corresponding control connector.

11. The retaining device according to claim 8, wherein at least one connector is provided with a controllable valve.

12. The retaining device according to claim 11, wherein the controllable valve can switch the vacuum to one of the teat cups.

13. The retaining device according to claim 11, wherein the controllable valve can be operated electrically.

14. The retaining device according to claim 1, wherein the fastening device is attached to a milking parlour support.

15. The retaining device according to claim 1, wherein the fastening device can be adjusted in such a way that the longitudinal axes of the milking cups are arranged virtually horizontally.

16. The retaining device according to claim 1, wherein the fastening device is formed in such a way that the retaining device can be moved from a first position, which corresponds to the first operational phase, into at least a second position for cleaning at least an area of the teat cups.

17. The retaining device according to 1, wherein at least an area of the retaining device is manufactured of plastic, said area holding the teat cups.

18. The retaining device according to claim 1, which furthermore has one or more cleaning connectors.

19. The retaining device according to claim 1, which furthermore has a cleaning device that can be moved from a first cleaning position in the first operational phase, in which the head piece of the teat cup liner can be exposed to the action of a cleaning fluid, into a second position for releasing the teat cups for the second operational phase.

20. The retaining device according to claim 19, wherein the cleaning device is provided with a sealing element for sealing the teat cup liner interior in the cleaning position.

21. The retaining device according to claim 20, wherein the sealing element has at least one nozzle element for the influx of a cleaning fluid into the teat cup liner interior.

22. The retaining device according to claim 1, which furthermore has a power supply unit.

23. The retaining device according to claim 22, wherein the power supply unit is pneumatically driven.

24. The retaining device according to claim 1, which furthermore has a sensor element that is formed to register the milk flow at least from one teat cup.

25. The retaining device according to claim 1, which furthermore comprises a quality sensor element that is formed to register at least one characteristic identifying the milk quality.

26. The retaining device according to claim 1, wherein the stimulation mechanism has a drive element and an actuator element coupled thereto, wherein the actuator element is in contact with the minimum of one milk hose and/or control hose during the milking.

27. The retaining device according to claim 1, wherein the stimulation mechanism comprises a control mechanism that is formed to control the frequency of the mechanical action and/or the strength of the mechanical action.

28. The retaining device according to claim 1, which furthermore has a holding area in each case for holding a teat cup, wherein each holding area comprises a fixative device that is formed to establish the orientation of the teat cup that is manually introduced into the holding area to a pre-defined orientation.

29. The retaining device according to claim 1, wherein hose sections are provided for connection to the teat cups, said hose sections having at least one profiled area and a corresponding guide section for guiding the profiled area.

30. The retaining device according to claim 29, wherein the hose section has a milk hose and at least one control hose that are connected in such a way as to define the profile of the profiled area.

31. The retaining device according to claim 1, which furthermore has a device for pulling hose sections coupled to the teat cups into a position for post-milking during the second operational phase.

32. A teat cup cluster with
a multiple number of teat cups,
a multiple number of connection hoses that are connected to the teat cups and
a retaining device according to claim 1.

33. The teat cup cluster according to claim 32, wherein the connection hoses have a milk-conducting line, a control line and/or a stimulation line.

34. A milking parlour with
a support for holding and guiding a milk line and a control line,
a multiple number of teat cups that are connected to the milk line and the control line in a fluid connection and
a retaining device according to claim 1.

35. A milking parlour according to claim 34, wherein the retaining device is mounted on the support by means of the fastening device.

36. A milking parlour according to claim 35, wherein the retaining device is mounted on the support in such a way that it can pivot, so that the retaining device can be pivoted at least into the milking position and a cleaning position.

37. A milking parlour according to claim 36, wherein the retaining device can be pivoted into a disinfection position for intermediate disinfection of the teat cups.

38. A milking parlour according to claim 37, which furthermore has a container for performing an intermediate disinfection in the disinfection position.

39. A milking parlour according to claim 38, wherein the container has a device for disinfection of an outer area of the teat cup.

40. A milking parlour according to claim 34, which furthermore comprises a hose guide mounted on the support, wherein the hose guide is formed to produce the fluid connection between the teat cups and the milk line in the first and second operational phases.

* * * * *